(12) United States Patent
Sato et al.

(10) Patent No.: US 9,371,458 B2
(45) Date of Patent: Jun. 21, 2016

(54) INK COMPOSITION FOR INK JET RECORDING AND INK JET RECORDING METHOD

(71) Applicant: Seiko Epson Corporation, Tokyo (JP)

(72) Inventors: Chigusa Sato, Shiojiri (JP); Shinichi Kato, Matsumoto (JP); Tomohito Nakano, Shiojiri (JP); Hiroki Nakane, Matsumoto (JP); Yoshinobu Sato, Osaka (JP); Hiroshi Sawada, Ikoma-gun (JP); Hirotoshi Koyano, Kobe (JP)

(73) Assignee: Seiko Epson Corporation, Tokyo (JP)

( * ) Notice: Subject to any disclaimer, the term of this patent is extended or adjusted under 35 U.S.C. 154(b) by 285 days.

(21) Appl. No.: 13/853,135

(22) Filed: Mar. 29, 2013

(65) Prior Publication Data

US 2014/0002556 A1 Jan. 2, 2014

(30) Foreign Application Priority Data

Jun. 27, 2012 (JP) ................................ 2012-143886

(51) Int. Cl.
| | |
|---|---|
| *B41J 2/01* | (2006.01) |
| *C09D 11/30* | (2014.01) |
| *B41J 2/21* | (2006.01) |
| *C09D 11/101* | (2014.01) |
| *C09D 11/38* | (2014.01) |

(52) U.S. Cl.
CPC ............... *C09D 11/30* (2013.01); *B41J 2/2107* (2013.01); *C09D 11/101* (2013.01); *C09D 11/38* (2013.01); *B41J 2/01* (2013.01)

(58) Field of Classification Search
CPC ............ B41J 2/01; B41J 2/211; B41J 2/1433; B41J 2/17; B41J 2/17593; B41J 2/2107; B41J 2/1755; B41J 2/2114; B41J 11/0015; B41J 11/002; B41J 2/2056; B41J 2/21; B41J 2/0057; B41J 3/60; C09D 11/36; C09D 11/40; C09D 11/30; C09D 11/38; C09D 11/322; C09D 11/328; C09D 11/101; C09D 11/005; C09D 11/54; C09D 11/52; B41M 5/0011; B41M 5/0017; B41M 7/00; B41M 7/0072; B41M 5/52; B41M 5/5218
USPC .................. 347/95–100, 102, 103, 88, 20, 21
See application file for complete search history.

(56) References Cited

U.S. PATENT DOCUMENTS

| | | | |
|---|---|---|---|
| 2009/0047431 A1* | 2/2009 | Hatada et al. | 427/256 |
| 2012/0225968 A1* | 9/2012 | Nakano et al. | 522/16 |
| 2013/0224651 A1 | 8/2013 | Kanasugi et al. | |
| 2013/0258005 A1* | 10/2013 | Hasegawa et al. | 347/86 |

FOREIGN PATENT DOCUMENTS

| | | |
|---|---|---|
| JP | 2004-285216 A | 10/2004 |
| JP | 2007-152767 A | 6/2007 |
| JP | 2009-197166 A | 9/2009 |
| JP | 2013-199114 A | 10/2013 |
| JP | 2015-515510 A | 5/2015 |
| WO | 2013/131924 A1 | 9/2013 |

* cited by examiner

*Primary Examiner* — Manish S Shah
(74) *Attorney, Agent, or Firm* — Nutter McClennen & Fish LLP; John J. Penny, Jr.; Isaac A. Hubner

(57) ABSTRACT

An ink composition for ink jet recording includes a coating film forming material, a polyether-modified silicone oil, and water, wherein the polyether-modified silicone oil is soluble in a solvent in which a lower limit of an SP value is 8.5 or less and an upper limit of the SP value is 18.0 or more.

1 Claim, 2 Drawing Sheets

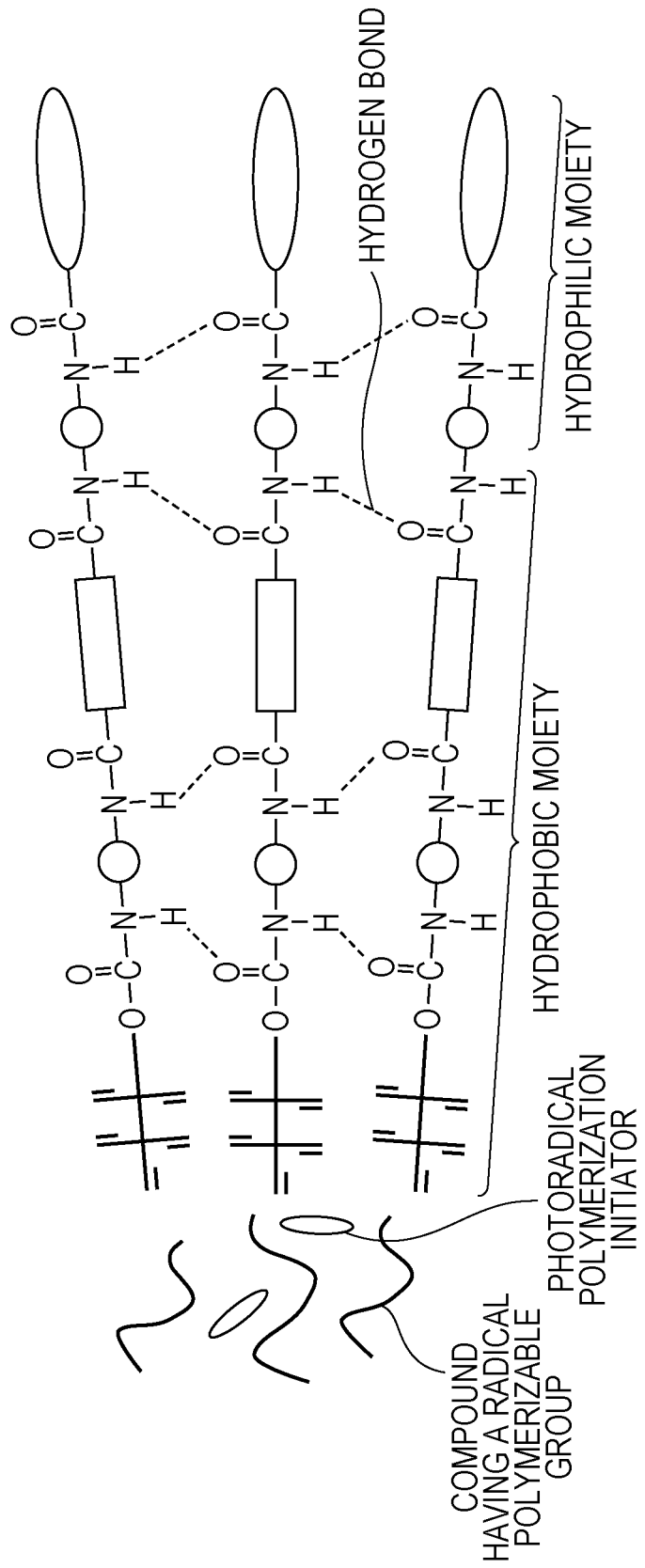

INK COMPOSITION FOR INK JET RECORDING AND INK JET RECORDING METHOD

BACKGROUND

1. Technical Field

The present invention relates to an ink composition for ink jet recording and an ink jet recording method using the same.

2. Related Art

In the related art, various kinds of methods have been used as a recording method for forming an image on a recording medium such as a paper based on an image data signal. Among these methods, an ink jet recording method is a method in which ink droplets are discharged from nozzles of a print head to be attached to the recording surface of a recording medium, then, a solvent is dried from the attached ink and colorants are fixed to a recording surface to perform recording. According to this method, high resolution and high quality images can be printed at a high speed.

In recent years, an ink composition suitable for ink jet recording has attracted attention to form images (including letters, the same shall apply hereinafter) with excellent water resistance, solvent resistance and abrasion resistance on a recording surface of a recording medium.

For example, a yellow ink (viscosity: 13 mPa·s, surface tension: 31 mN/m), which is obtained by adding approximately 30 g (solid content) of a pigment dispersion liquid formed of C.I. Pigment Yellow 128 and the like, 30 g of a photopolymerizable compound dispersion liquid formed of polyester diacrylate (bifunctional, acid value: 10 or less), 100 g of ethylene glycol, glycerin as a viscosity modifier, sodium dodecyl sulfate as a surface tension adjuster, ammonia as a pH adjuster, and water and in which a photopolymerizable monomer is present in an emulsion state, is disclosed in JP-A-2004-285216.

However, the ink having a low surface tension and containing polyester diacrylate as a coating film forming material disclosed in JP-A-2004-285216 has a problem of deterioration in at least any one of solid filling properties, storage stability and abrasion resistance.

SUMMARY

An advantage of some aspects of the invention is to provide an ink composition for ink jet recording having excellent solid filling properties, storage stability and abrasion resistance.

The inventors conducted a keen examination for solving the aforementioned problem. First, when an ink composition for ink jet recording (hereinafter, simply referred to as an "ink composition") having excellent solid filling properties was examined, it was found that an ink composition having a low surface tension was difficult to wet and spread on a recording medium and hence, solid filling properties were deteriorated.

A method for improving the wettability and spreadability of the ink composition was examined in consideration of the aforementioned finding. First, when an ink composition not containing a coating film forming material was prepared, it was found that abrasion resistance and image quality were deteriorated. Here, a composition as an ink composition containing a coating film forming material with excellent solid filling properties was examined. As a result, when a polyether-modified siloxane oil (hereinafter, also referred to as a "polyether-modified silicone oil") soluble in a solvent in which an SP value is in a predetermined range and acting on surface control of a recording medium was contained in the ink composition, it was thought that solid filling properties was excellent.

The polyether-modified silicone oil in which the upper limit of the SP value was in a relatively low range (approximately 15), that is, which had a high hydrophobicity was contained in the ink composition. Then, while the wettability and spreadability were favorable, a clouding point was extremely low in the system having a high solid content (a low solvent content) such as an aqueous photocurable ink. Therefore, it was found that storage stability, particularly, storage stability under a high temperature was deteriorated. On the other hand, when the polyether-modified silicone oil in which the lower limit of the SP value was in a relatively high range (approximately 13), that is, which has a high hydrophilicity was contained in the ink composition, the wettability and spreadability were deteriorated. Therefore, it was found that solid filling properties were deteriorated. Then, the polyether-modified silicone oil having a high hydrophilicity is appropriately used mainly in an aqueous ink.

As a further examination result of the inventors based on the above finding, the inventors have completed the invention by discovering that the aforementioned problem can be solved by an ink composition containing a polyether-modified silicone oil that is excellent in balance between hydrophobicity and hydrophilicity to have a wide solubility range, specifically, a polyether-modified silicone oil soluble in a solvent in which the lower limit of the SP value is 8.5 or less and the upper limit of the SP value is 18.0 or more.

Meanwhile, regardless of the index of the SP value, it was found that the aforementioned problem could be solved by an ink composition that contains a compound at least represented by a predetermined general formula (A) as a polyether-modified silicone oil.

That is, aspects of the invention are as follows.

[1] An ink composition for ink jet recording including a coating film forming material, a polyether-modified silicone oil, and water, wherein the polyether-modified silicone oil is soluble in a solvent in which a lower limit of an SP value is 8.5 or less and an upper limit of the SP value is 18.0 or more.

[2] The ink composition for ink jet recording according to [1], wherein the coating film forming material is in a dispersed state.

[3] The ink composition for ink jet recording according to [1] or [2], wherein the coating film forming material includes a photocurable compound and is a photocurable ink.

[4] The ink composition for ink jet recording according to any one of [1] to [3], wherein the coating film forming material is a non-photocurable resin.

[5] The ink composition for ink jet recording according to any one of [1] to [4], wherein the polyether-modified silicone oil has a polyethylene oxide modified group.

[6] An ink composition for ink jet recording including: a coating film forming material, a polyether-modified silicone oil, and water, wherein the polyether-modified silicone oil is a compound at least represented by the following general formula (A).

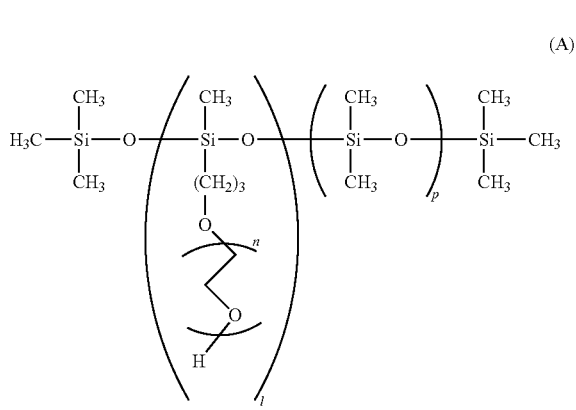

(A)

(wherein in the formula (A), l is 6 to 12, n is 3 to 12, and p is 25 or less).

[7] An ink jet recording method including discharging and attaching the ink composition for ink jet recording according to any one of [1] to [6] to a recording medium from a print head, and heating the recording medium to which the ink composition for ink jet recording is attached.

[8] An ink jet recording method including discharging and attaching the ink composition for ink jet recording according to any one of [1] to [6] to a recording medium from a print head, and curing the attached ink composition for ink jet recording by ultraviolet irradiation.

BRIEF DESCRIPTION OF THE DRAWINGS

The invention will be described with reference to the accompanying drawings, wherein like numbers reference like elements.

FIG. 2 is a schematic diagram microscopically illustrating the (aqueous) photocurable resin emulsion according to the embodiment of the invention.

DESCRIPTION OF EXEMPLARY EMBODIMENTS

Figure 1:
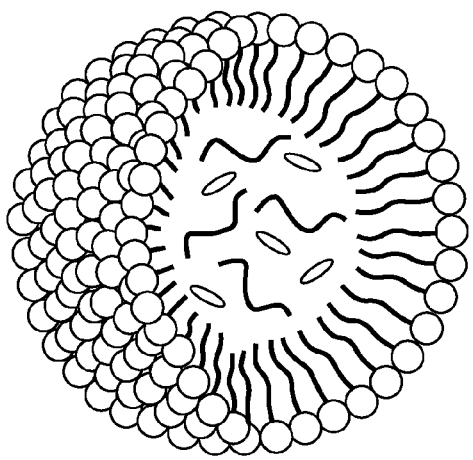
FIG. 1 is a schematic diagram macroscopically illustrating the (aqueous) photocurable resin emulsion according to an embodiment of the invention.

Hereinafter, the embodiments to realize the invention are described in detail. The invention is not limited to the following embodiments and can be realized in various modifications in the scope of the gist of the invention. In addition, there are some cases in which the same letters are used as variables between different chemical formulae, and these letters are not related each other.

In the specification, the "curing" means a phenomenon such that an ink is solidified by polymerizing a compound having a photopolymerizable group when the ink containing the compound having the photopolymerizable group is irradiated with light. The "curability" means properties such that curing occurs as a result of sensing light, and also referred to as photopolymerizability.

The "recorded matter" means a cured product formed on a recording medium by the ink recorded thereon. The cured product in the specification means a cured substance (image) including a cured film or a coating film.

In the specification, the "solid filling properties" refers to filling properties, and properties such that a recording medium, which is a substrate, is invisible when a recorded matter is seen from a side in which a cured product (solid image) is formed. The "solid image" means an image in which dots are recorded with respect to all pixels, each of which is the minimum recording unit region defined by recording resolution, and a recording region of a recording medium is covered with an ink so that a recording surface is invisible, and the "solid printing" means printing of the solid image.

In the specification, the "storage stability" means properties such that the viscosity is hardly changed between before and after the storage when an ink is stored for a predetermined period. The "discharge stability" means properties such that when the ink discharged from nozzles of a print head lands on a recording medium, ink droplets are hardly shifted from a predetermined position (land shift occurs), or a mist is hardly generated due to the separation of the ink droplets. The "adhesion" means properties such that the coating film of an ink is hardly detached from a substrate. The "abrasion resistance" means properties such that when a cured ink (cured product) is rubbed, the cured product is hardly detached and scratched.

In the specification, "(meth)acrylate" means at least any one of an acrylate and a methacrylate corresponding to the acrylate, "(meth)acryl" means at least any one of an acryl and a methacryl corresponding to the acryl, and "(meth)acryloyl" means at least any one of an acryloyl and a methacryloyl corresponding to the acryloyl.

Ink Composition for Ink Jet Recording

An embodiment of the invention relates to an ink composition for ink jet recording. The ink composition for ink jet recording includes a coating film forming material, a polyether-modified silicone oil, and water. In addition, the polyether-modified silicone oil is soluble in a solvent having the lower limit of an SP value of 8.5 or less and the upper limit of 18.0 or more.

Hereinafter, additives (components) included or possibly included in the ink composition will be described.

1. Coating Film Forming Material

The ink composition according to the embodiment contains a coating film forming material. The coating film forming material is not limited to the following examples, and, for example, there may be any one of photocurable compounds which are cured (photopolymerized) when ultraviolet irradiation is performed, and non-photocurable compounds which do not cured even when ultraviolet irradiation is performed.

Among the coating film forming materials, since the adhesion and the abrasion resistance of the ink composition are more excellent, a polymer (hereinafter, referred to as "photocurable resin") or an oligomer (hereinafter, referred to as "photocurable oligomer") having a photoradical polymerizable group, and the non-photocurable resin are preferable. Since storage stability and curability of the ink composition are more excellent, the polymer or the oligomer is preferable among the photocurable compounds, and the polymer is more preferable.

Here, in the specification, the monomer means a monomer having a weight average molecular weight of, for example, up to several hundreds, preferably less than 800. The oligomers mean a dimer to a lower polymer consisting of several monomer units having a weight average molecular weight of, for example, up to several thousands, and preferably 800 or more and less than 1,500. The polymer (resin) means a polymer having a weight average molecular weight of, for example, several thousands or more, and preferably 1,500 or more.

The weight average molecular weight as referred to in the specification means the weight average molecular weight determined relative to polystyrene standards, and can be calculated by measuring the molecular weight distribution on the basis of gel permeation chromatography (GPC). The measurement method on the basis of GPC is a method with a GPC (HLC-8220 (trade name), manufactured by TOSOH CORPORATION) in which serially-connected three columns TSK-gel Super HZM-M (exclusion limit molecular weight: $4\times10^6$, molecular weight fraction range: 266 to $4\times10^6$, number of theoretical stages: 16,000 stages/column, packing material: styrene-based copolymer, packing particle size: 3 µm) are used.

Here, the ink composition containing a non-photocurable compound without a photocurable compound as the coating film forming material is classified as an aqueous ink. On the other hand, the ink composition containing a photocurable compound as the coating film forming material is classified as an aqueous photocurable ink.

Since aqueous inks used in ink jet recording contain no volatile components, the aqueous inks are excellent from the viewpoints of safety and environmental concerns. However, when such aqueous inks are used for printing on high-quality paper or regular paper, the inks are likely to spread on the paper, and when such inks are used for printing on paper used in running on, drying is insufficient and hence it is difficult to perform high-speed printing. Further, there is caused a problem that it is difficult to fix the ink printed on ink-nonabsorbing recording media (such as a polymer resin film, earthenware or a glass substrate). For the purposed of solving such problems, the aqueous photocurable inks have a feature in which such problems in the aqueous inks do not arise. Accordingly, since the adhesion of ink is more excellent, the ink composition according to the embodiment is more preferably an aqueous photocurable ink. That is, it is preferable that the ink composition according to the embodiment contain a photocurable compound among the coating film forming materials.

When the ink composition according to the embodiment is a photocurable ink, curing can occur as a result of light irradiation. Therefore, since heating energy that is necessary for a heating process can be reduced, the heating temperature can be relatively decreased or the heating time can be relatively reduced. In addition, storage stability and adhesion of the ink composition are more excellent, and the print head is hardly clogged even when the ink is left for a long time in a state in which the ink composition is not discharged from the print head.

The coating film forming material is preferably in a dispersed state as described below, and more preferably in the form of emulsion. The coating film forming material in the form of emulsion is not limited to the following example, and an example of the coating film forming material in the form of emulsion includes a self-emulsifying emulsion.

Hereinafter, the photocurable compound and the non-photocurable resin will be mainly described.

2. Photocurable Compound

The photocurable compound can be also referred to as a compound having a photopolymerizable group. Specific examples of component forming the photopolymerizable group include unsaturated carboxylic acids such as (meth)acrylate, itaconic acid, crotonic acid, isocrotonic acid and maleic acid, and salts thereof, ester, urethane, amide and anhydrides thereof, acrylonitrile, styrene, various unsaturated polyesters, unsaturated polyethers, unsaturated polyamides, and unsaturated urethanes, N-vinyl compounds, urethane (meth)acrylate, epoxy (meth)acrylate, oxetane (meth)acrylate, and polyester (meth)acrylate.

Among the compounds having the photopolymerizable group, a compound having a photoradical polymerizable group is preferable. The compound having a photoradical polymerizable group is polymerized by action of a photoradical polymerization initiator which will be described later, as a result of ultraviolet irradiation, to cure the printed ink. The ink composition cured in such a manner forms a cured film on the recording medium.

In the compound having a photoradical polymerizable group, the photoradical polymerizable group is not limited to the following examples, and examples of the photoradical polymerizable group include a (meth)acryloyl group, a vinyl group, a vinyl ether group and a mercapto group. Among these, a compound having the (meth)acryloyl group is preferable and a compound having one or more acryloyl groups in the structure thereof is more preferable.

From the viewpoint of a molecular weight, examples of the compound having a photoradical polymerizable group include a monomer, an oligomer and a polymer (resin).

Among the photocurable compounds according to the embodiment, at least any one of urethane (meth)acrylate represented by the general formula (1) described later, crosslinked urethane (meth)acrylate having a constitutional unit including the urethane (meth)acrylate, and a polymer (photocurable resin) having a photoradical polymerizable group is preferably contained. In this case, since the abrasion resistance and adhesion are more excellent, and self-emulsifying capability and emulsifiability are excellent, particularly, self-emulsifying emulsion can be suitably formed.

Hereinafter, preferred photocurable compounds thereof will be respectively described.

2-1. Urethane (Meth)Acrylate Represented by General Formula (1)

The ink composition according to the embodiment may contain urethane (meth)acrylate represented by the general formula (1). Due to this, self-emulsifying capability and emulsifiability are excellent.

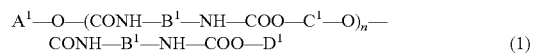

$$A^1—O—(CONH—B^1—NH—COO—C^1—O)_n—CONH—B^1—NH—COO—D^1 \quad (1)$$

In the formula (1), n express a nature number of 1 to 30, $A^1$ express a residue of a hydroxyl group-containing (meth)acrylate, $B^1$ express a residue of diisocyanate, $C^1$ express a residue of a diol of an acyclic hydrocarbon or a cyclic hydrocarbon in which the number of carbon atoms is 6 to 20, and $D^1$ express a residue of a polyoxyalkylene glycol monoalkyl ether.

The residue as referred to herein means, in the structure of the material of the urethane (meth)acrylate represented by the general formula (1), the moiety not including the functional group forming the urethane bond; specifically, the residue means the moiety (represented by $A^1$) not including the hydroxyl group in the case of the hydroxyl group-containing (meth)acrylate, the moiety ($B^1$) not including the isocyanate group in the case of diisocyanate, and the moiety ($D^1$) not including the hydroxyl group in the case of the polyoxyalkylene glycol monoalkyl ether.

The weight average molecular weight of the urethane (meth)acrylate represented by the general formula (1) is 1,000 to 10,000, and preferably 2,000 to 8,000. When the weight average molecular weight is in the aforementioned range, the urethane (meth)acrylate tends to form micelles, is excellent in self-emulsifiability, and further there is obtained an advantageous effect such that hydrophobic substances tend to be included in the micelles. It can be considered that this is because the adoption of the urethane (meth)acrylate represented by the general formula (1) provides an excellent balance between hydrophilicity and hydrophobicity.

The weight average molecular weight of the urethane (meth)acrylate represented by the general formula (1) can be calculated by measuring the molecular weight distribution on the basis of gel permeation chromatography (GPC), as described above.

In the general formula (1), n express a natural number of 1 to 30. The specific numerical value of n is determined by regulating the aforementioned weight average molecular weight.

2-1-1. Hydroxyl Group-Containing (Meth)Acrylate

The hydroxyl group-containing (meth)acrylate is a compound which gives the structure of $A^1$ in the general formula (1). The hydroxyl group-containing (meth)acrylate is used for the purpose of introducing a polymerizable group into the general formula (1). Specifically, the hydroxyl group-containing (meth)acrylate is a compound having one or more (meth)acryloyl groups and one hydroxyl group, and the urethanation reaction of the hydroxyl group with one isocyanate group in the diisocyanate introduces a (meth)acryloyl group to one terminal of the main chain of the urethane (meth)acrylate. The introduction of at least one (meth)acryloyl group enables photopolymerization (curing), and the introduction of two or more (meth)acryloyl groups increases the photopolymerization rate and provides an advantageous effect to increase the hardness of the cured product.

The monofunctional monohydroxymono(meth)acrylate is not particularly limited. However, examples of the monohydroxymono(meth)acrylate include 2-hydroxyethyl (meth)acrylate, 2-hydroxypropyl (meth)acrylate, polyethylene glycol mono(meth)acrylate, polypropylene glycol mono(meth)acrylate and polycaprolactone mono(meth)acrylate.

The bifunctional monohydroxydi(meth)acrylate is not particularly limited. However, examples of the monohydroxydi(meth)acrylate include glycerol di(meth)acrylate.

The trifunctional or higher functional monohydroxypoly(meth)acrylate is not particularly limited; however, examples of the monohydroxypoly(meth)acrylate include pentaerythritol tri(meth)acrylate and dipentaerythritol penta(meth)acrylate.

Since an emulsion having a particularly low viscosity is obtained, preferable among these is polypropylene glycol mono(meth)acrylate and more preferable among these is polypropylene glycol monoacrylate. On the other hand, particularly, since an emulsion excellent in curability is obtained, preferable as the hydroxyl group-containing (meth)acrylate is at least any one of pentaerythritol tri(meth)acrylate and dipentaerythritol penta(meth)acrylate.

The aforementioned hydroxyl group-containing (meth) acrylates may be used each alone or in combination of two or more kinds thereof.

2-1-2. Diisocyanate

The diisocyanate is a compound which gives the structure of $B^1$ in the general formula (1). The diisocyanate means an organic diisocyanate having two reactive isocyanate groups in one molecule thereof.

Urethane (meth)acrylate synthesized by using an organic polyisocyanate having three or more isocyanate groups in the molecule thereof tends to be high in molecular weight and tends to be high in viscosity. The emulsion prepared by emulsifying in water such a urethane (meth)acrylate having the following structure also tends to be high in viscosity: the structure has a hydrophilic group in the molecule of the urethane (meth)acrylate, wherein the main skeleton is formed of a polyisocyanate having three or more isocyanate groups, and the branched chains are formed of a molecular chain having at least one hydrophilic group and a molecular chain having at least two or more (meth)acryloyl groups.

On the contrary, the urethane (meth)acrylate synthesized by using a diisocyanate having two isocyanate groups in the molecule thereof has a linear structure in which the structure derived from the diisocyanate and the structure derived from the diol are linearly arranged and as shown in the general formula (1), there is at one terminal a hydrophilic moiety derived from polyoxyalkylene glycol monoalkyl ether, and there is arranged at the other terminal a hydrophobic moiety in which to a structure derived from a (meth)acrylate having one or more (meth)acryloyl groups and one hydroxyl group, a structure derived from the diol of an acyclic hydrocarbon or a cyclic hydrocarbon having two hydroxyl groups in the molecule thereof is bonded through diisocyanate by urethane bond. Due to such a structure as described above, the urethane (meth)acrylate synthesized by using a diisocyanate having two isocyanate groups in the molecule thereof is particularly excellent in emulsifiability in water and can drastically reduce the viscosity of the emulsion as compared to the emulsions of urethane (meth)acrylates in the related art.

The diisocyanate is not particularly limited; however, examples of the diisocyanate include: diisocyanates having an alicyclic hydrocarbon skeleton such as isophorone diisocyanate; diisocyanates having an aliphatic hydrocarbon skeleton such as hexamethylene diisocyanate; diisocyanates having an aromatic hydrocarbon skeleton such as xylylene diisocyanate, tolylene diisocyanate and diphenylmethane diisocyanate; and diisocyanates having a hydrogenated aromatic hydrocarbon skeleton such as hydrogenated xylylene diisocyanate and hydrogenated diphenylmethane diisocyanate.

Since there is obtained an advantageous effect such that the cured product of the urethane (meth)acrylate hardly undergoes yellowing due to sun light (ultraviolet rays), preferable among these diisocyanates are one or more selected from the group consisting of isophorone diisocyanate, hexamethylene diisocyanate, hydrogenated xylylene diisocyanate and hydrogenated diphenylmethane diisocyanate.

The diisocyanates may be used intramolecularly or intermolecularly each alone or in combination of two or more kinds thereof.

2-1-3. Diol of Acyclic Hydrocarbon or Cyclic Hydrocarbon Having 6 to 20 Carbon Atoms The residue of diol of an acyclic hydrocarbon or a cyclic hydrocarbon having 6 to 20 carbon atoms is a moiety not including a functional group forming the urethane bond in the structure of the urethane (meth)acrylate material represented by the general formula (1), and specifically, is a moiety ($C^1$) not including a hydroxyl group in the diol of the acyclic hydrocarbon or the cyclic hydrocarbon having 6 to 20 carbon atoms.

The diol is introduced for the purpose of regulating the degree of the hydrophobicity of the hydrophobic moiety of the urethane (meth)acrylate represented by the general formula (1). The diol is selected to provide a favorable hydrophobicity. As specific examples, one or more diols selected from the group consisting of aliphatic, alicyclic and aromatic diols each having two hydroxyl groups in one molecule thereof are preferably used, and more preferable among such diols are diols exhibiting favorable hydrophobicity. Specifically, because of being particularly excellent in the hydrophobicity, the number of the carbon atoms in the diol of the acyclic hydrocarbon or the cyclic hydrocarbon is preferably 6 to 20.

In addition, it is also possible to select as the diols, according to the intended use or intended purpose, those diols which are appropriate for controlling the rigidity or flexibility of the urethane (meth)acrylate and exhibit favorable hydrophobicity.

As the aforementioned aliphatic diols, known aliphatic diols can be used without any particular limitation as long as the aliphatic diols do not have any aromatic structure or any alicyclic structure in the molecule thereof. Specific examples of the aliphatic diol include 1,8-octanediol, 1,9-nonanediol, 1,10-decanediol, 1,11-undecanediol, 1,12-dodecanediol, 1,13-tridecanediol, 1,14-tetradecanediol, 1,15-pentadecanediol, 1,18-octadecanediol, 1,19-nonadecanediol, 1,20-eicosanediol, polypropylene glycol (for example, dipropylene glycol and tripropylene glycol), aliphatic polycarbonate polyol, aliphatic polyester polyol and aliphatic polycaprolactone diol.

As the aforementioned aromatic diols, known aromatic diols can be used without any particular limitation as long as the aromatic diols have an aromatic structure in the molecule thereof. Specific examples of the aromatic diol include biphenyl-4,4'-diol, 1,4-benzenediol, bisphenol A, ethylene oxide-modified bisphenol A, propylene oxide-modified bisphenol A, aromatic polycarbonate polyol and aromatic polyester polyol.

As the aforementioned alicyclic diols, known alicyclic diols can be used without any particular limitation as long as the alicyclic diols have an alicyclic structure in the molecule thereof. Specific examples of the alicyclic diol include hydrogenated bisphenol A, ethylene oxide-modified hydrogenated bisphenol A, propylene oxide-modified hydrogenated bisphenol A, 1,4-cyclohexanediol, tricyclodecanedimethanol, alicyclic polycarbonate polyol and alicyclic polyester polyol.

Since favorable emulsification in water is achieved and the cured product of the urethane (meth)acrylate hardly undergoes yellowing due to sun light (ultraviolet rays), preferable among these are aliphatic diols and alicyclic diols. Preferable among the aliphatic diols are one or more selected from the group consisting of 1,8-octanediol, 1,9-nonanediol, 1,10-decanediol, 1,11-undecanediol, 1,12-dodecanediol, 1,13-tridecanediol, 1,14-tetradecanediol, 1,15-pentadecanediol, 1,18-octadecanediol, 1,19-nonadecanediol, 1,20-eicosanediol, polypropylene glycol, aliphatic polycarbonate polyol, aliphatic polyester polyol and aliphatic polycaprolactone diol. Preferable among the alicyclic diols are one or more selected from the group consisting of hydrogenated bisphenol A, ethylene oxide-modified hydrogenated bisphenol A, propylene oxide-modified hydrogenated bisphenol A, 1,4-cyclohexanediol and tricyclodecanedimethanol.

The aforementioned diols may be used intramolecularly or intermolecularly each alone or in combination of two or more kinds thereof.

2-1-4. Polyoxyalkylene Glycol Monoalkyl Ether

The polyoxyalkylene glycol monoalkyl ether is a compound which gives the structure of $D^1$ in the general formula (1). Polyoxyalkylene glycol monoalkyl ether is a compound in which one hydroxyl group of polyoxyalkylene glycol is blocked with an alkyl group, and is represented by the following general formula (2).

$$HO—(CH_2CH_2O)_m—R \qquad (2)$$

In the formula (2), R express an alkyl group and m express a natural number of 9 to 90.

The urethanation reaction of the hydroxyl group with one isocyanate group in the diisocyanate introduces the hydroxyl group to one terminal of the main chain of the urethane (meth)acrylate. Consequently, the urethane (meth)acrylate has a structure of an amphiphilic substance which has a hydrophilic moiety at one terminal of the linear main chain of the substance, and has a hydrophobic moiety constituted of one or more polymerizable (meth)acryloyl groups and hydrophobic groups at the other terminal of the linear main chain; thus, the urethane (meth)acrylate is particularly excellent in emulsifiability in water.

Moreover, since there is obtained an advantageous effect such that the hydrophilicity can befreely adjusted, the polyoxyalkylene glycol monoalkyl ether preferably includes a polyoxyethylene structure in the molecule thereof.

The polyoxyethylene structure is the repeated structure of the oxyethylene group. The average repetition number of the oxyethylene groups, that is, m in the general formula (2) is determined by regulating the balance between hydrophilicity and hydrophobicity so as to result in favorable emulsification in water of the urethane (meth)acrylate, and is preferably a natural number of 9 to 90, more preferably a natural number of 9 to 60 and furthermore preferably a natural number of 9 to 30.

The polyoxyalkylene glycol monoalkyl ether is not particularly limited. However, examples of the polyoxyalkylene glycol monoalkyl ether include polyethylene glycol monoalkyl ethers such as polyethylene glycol monomethoxy ether and polyethylene glycol monoethoxy ether.

It is also possible to use polyoxyalkylene glycol monoalkyl ethers including in addition to the polyoxyethylene structure, other polyoxyalkylene structures in the molecules thereof. In this case, it is preferable for emulsification that the polyoxyethylene structure be located on the side of the terminal alkyl group. Examples of the polyoxyalkylene structure usable in this case together with the polyoxyethylene structure include a polyoxypropylene structure and a polyoxytetramethylene structure. The repetition number of the oxyalkylene group of the polyoxyalkylene structure used together with the polyoxyethylene structure is appropriately determined in consideration of the balance between hydrophilicity and hydrophobicity of the urethane (meth)acrylate.

The terminal alkyl group of the polyoxyalkylene glycol monoalkyl ether, that is, R in the general formula (2) is preferably a methyl group, an ethyl group or a propyl group, and more preferably a methyl group because the smaller is the number of carbon atoms of the alkyl group, the more the hydrophobicity is decreased and the more excellent is the emulsifiability.

The aforementioned polyoxyalkylene glycol monoalkyl ethers may be used each alone or in combination of two or more kinds thereof.

2-2. Cross-Linked Urethane (Meth)Acrylate

The ink composition of the embodiment may include a cross-linked urethane (meth)acrylate having a constitutional unit including the urethane (meth)acrylate. The cross-linked urethane (meth)acrylate having as the constitutional unit the urethane (meth)acrylate represented by the general formula (1) (hereinafter, simply referred to as the "cross-linked urethane (meth)acrylate") is excellent in curability of ink and more excellent in storage stability of the emulsion.

In addition, the ink composition of the embodiment may include the cross-linked urethane (meth)acrylate together with the urethane (meth)acrylate represented by the general formula (1).

2-2-1. Cross-Linking Agent

The aforementioned cross-linked urethane (meth)acrylate can be obtained by allowing the aforementioned urethane (meth)acrylate represented by the general formula (1) and a bifunctional or higher functional cross-linking agent to react with each other.

The use of a cross-linking agent enables to increase the molecular weight of the urethane (meth)acrylate. Thus, it is possible to obtain a cross-linked urethane (meth)acrylate more excellent in curability and more excellent in storage stability of the emulsion.

Gelification can be prevented by performing the reaction, any one in a solvent system nor in a solvent-free system, but in the oil system (oil phase) in an O/W emulsion.

The aforementioned bifunctional or higher functional cross-linking agent is preferably hydrophobic since this cross-linking agent additionally reacts with the (meth)acryloyl group. In other words, the bifunctional or higher functional cross-linking agent undergoes the Michael addition to the (meth)acryloyl group in the urethane (meth)acrylate represented by the general formula (1), in the oil phase of an emulsion, and thus cross-links the urethane (meth)acrylate.

Examples of such a cross-linking agent that reacts with the (meth)acryloyl group include cross-linking agents having thiol groups or amino groups in the molecules thereof. Among such cross-linking agents, any one of a multifunctional thiol compound and a multifunctional amine compound is preferable due to the capability of allowing the reaction to proceed rapidly, a multifunctional thiol compound being more preferable.

The aforementioned bifunctional and higher functional cross-linking agent is not particularly limited, and specific examples of the cross-linking agent include mercapto group-containing compounds and amino group-containing compounds. Preferable among these compounds are mercapto group-containing compounds due to being low in solubility in water and tending to be incorporated into the oil phase when dispersed in water.

The aforementioned mercapto group-containing compound is not particularly limited, and examples of the mercapto group-containing compound include pentaerythritol tetrakis(3-mercaptopropionate) (hereinafter, also referred to as "PEMP"), trimethylolpropane tris(3-mercaptopropionate), tris-[(3-mercaptopropionyloxy)-ethyl]-isocyanurate, tetraethylene glycol bis(3-mercaptopropionate), dipentaerythritol hexakis(3-mercaptopropionate), pentaerythritol tetrakis(3-mercaptobutyrate) and trimethylolpropane tris(3-mercaptobutyrate).

The content of the aforementioned bifunctional or higher functional cross-linking agent is preferably 3 to 10% by mass and more preferably 5 to 8% by mass in relation to the total mass (100% by mass) of the (meth)acryloyl group-containing resin.

The "(meth)acryloyl group-containing resin" as referred to in the specification means all the resins that contain the (meth)acryloyl groups undergoing cross-linking by the aforementioned cross-linking agents. Accordingly, the (meth)acryloyl group-containing resin includes the urethane (meth)acrylate represented by the general formula (1) and a compound having three or more (meth)acryloyl groups in the molecule thereof.

The weight average molecular weight of the cross-linked urethane (meth)acrylate may have a weight average molecular weight in which the urethane (meth)acrylate represented by the general formula (1) as the constitutional unit thereof is in the aforementioned range, and is preferably 2,000 to 8,000 without any limitation.

The urethane (meth)acrylate containing the cross-linked urethane (meth)acrylate above described may be used alone or in combination of two or more kinds thereof.

The content of the urethane (meth)acrylate represented by the general formula (1) and the cross-linked urethane (meth) acrylate is 1 to 60% by mass, more preferably 5 to 50% by mass, still more preferably 5 to 40% by mass, far more preferably 5 to 20% by mass, and particularly preferably 5 to 15% by mass in relation to the total amount (100% by mass) of the ink composition. In a case in which the content is in the aforementioned range, a coating film can be formed and coating film performances such as favorable film strength and favorable adhesion can be obtained, when the urethane (meth) acrylate represented by the general formula (1) and the cross-linked urethane (meth)acrylate are used as the ink composition.

2-3. Method for Producing Urethane (Meth)Acrylate

Hereinafter, the method for producing the aforementioned urethane (meth)acrylate represented by the general formula (1) in the aforementioned urethane (meth)acrylates will be described. The urethane (meth)acrylate is obtained by reacting the hydroxyl group-containing (meth)acrylate, diisocyanate, diol of an acyclic hydrocarbon or a cyclic hydrocarbon having 6 to 20 carbon atoms, and polyoxyalkylene glycol monoalkyl ether with each other. More specifically, the method for producing the urethane (meth)acrylate includes a first step, a second step and a third step.

In the first step, a first urethane bond-containing reaction product represented by the following general formula (1a) by allowing the diisocyanate and the diol of an acyclic hydrocarbon or a cyclic hydrocarbon preferably having 6 to 20 carbon atoms to react with each other:

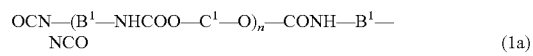

$$\text{OCN}-(B^1-\text{NHCOO}-C^1-O)_n-\text{CONH}-B^1-\text{NCO} \quad (1a)$$

In the first step, the molar ratio between the diisocyanate and the diol of an acyclic hydrocarbon or a cyclic hydrocarbon having 6 to 20 carbon atoms is preferably 5:1 to 5:4 and more preferably 5:2 to 5:3.

In the second step, a second reaction product represented by the following general formula (1b) is obtained by allowing the first reaction product and the polyoxyalkylene glycol monoalkyl ether to react with each other:

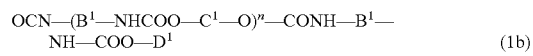

$$\text{OCN}-(B^1-\text{NHCOO}-C^1-O)^n-\text{CONH}-B^1-\text{NH}-\text{COO}-D^1 \quad (1b)$$

In the second step, the molar ratio between the first reaction product and the polyoxyalkylene glycol monoalkyl ether is preferably 1:0.5 to 1:1 since emulsification in water is favorable.

In the third step, the second reaction product and the hydroxyl group-containing (meth)acrylate are allowed to react to each other. In the third step, the molar ratio between the second reaction product and the hydroxyl group-containing (meth)acrylate is preferably 1:1.5 to 1:1 and more preferably 1:1.4 to 1:1.2.

2-4. Method for Producing Cross-Linked Urethane (Meth) Acrylate

The method of producing a cross-linked urethane (meth) acrylate is a method of producing the cross-linked urethane (meth)acrylate. The production method includes a fourth step in which the urethane (meth)acrylate represented by the general formula (1), obtained by performing the first step to the third step and the bifunctional or higher functional cross-linking agent are allowed to react with each other, so that the urethane (meth)acrylate is cross-linked.

In the fourth step, in addition to the urethane (meth)acrylate represented by the general formula (1), the compound having three or more (meth)acryloyl groups in the molecule thereof may also be allowed to react with the bifunctional or higher functional cross-linking agent.

In the fourth step, a urethane (meth)acrylate for fixing may further be added. In particular, when the recording medium (substrate) is made of polyvinyl chloride (hereinafter, simply referred to as "PVC"), it is preferable to further add a urethane (meth)acrylate for fixing which will be described later. Specifically, when a PVC substrate is used, the coating film (to be described later) is necessary to have adhesion to the PVC substrate. Here, the addition of the urethane (meth)acrylate for fixing makes favorable the adhesion to the substrate, and hence it can be said that the use of the urethane (meth)acrylate for fixing is preferable.

When a substrate made of a material other than PVC, for example, polyethylene terephthalate (PET) is used, curability is more favorable and storage stability of the emulsion is more excellent because of the reason that the particles are fined, and hence the content (addition amount) of the urethane (meth) acrylate for fixing is preferably low, and the content of the compound having three or more (meth)acryloyl groups is preferably set at a correspondingly larger value.

In the fourth step, the ratio between the content of the urethane (meth)acrylate represented by the general formula (1) and (when present) the compound having three or more (meth)acryloyl groups in the molecule thereof and the content of the bifunctional or higher functional cross-linking agent is preferably 100:1 to 100:10 and more preferably 100:5 to 100:8 in terms of mass. When the content ratio is equal to or more than the lower limit of the aforementioned range, curability and storage stability are more excellent. When the content ratio is equal to or less than the upper limit of the aforementioned range, the occurrence of undissolved substances can be prevented, and the vanishing of the (meth) acryloyl group in the system is prevented, and thus curability can be maintained more favorable.

As described above, in the fourth step, the urethane (meth) acrylate represented by the general formula (1), the bifunctional or higher functional cross-linking agent such as a multifunctional thiol monomer, and one or more, as the optional components, selected from the group consisting of the compound having three or more (meth)acryloyl groups in the molecule thereof, the urethane (meth)acrylate for fixing, the photopolymerization initiator preferably including thioxanthone-based initiators and the fluorescent brightening agent are mixed together, and the resulting mixture is emulsified (dispersed in water) by dropwise adding water to the mixture. The obtained emulsion is heated, for example, at 80° C. for 6 hours, and consequently the Michael addition reaction is accelerated to obtain the cross-linked urethane (meth)acrylate.

In this case, the compound having a (meth)acryloyl group and the cross-linking agent react with each other and consequently the compound having a (meth)acryloyl group is cross-linked. In other words, the cross-linking agent reacts not only with the urethane (meth)acrylate but also with the compound having a (meth)acryloyl group. Accordingly, in the structure of the cross-linked urethane (meth)acrylate, there can be concomitantly present various cross-linked compounds such as a compound resulting from the mutual cross-linking of the urethane (meth)acrylates represented by the general formula (1), a compound resulting from the cross-linking between the urethane (meth)acrylate represented by the general formula (1) and the (meth)acryloyl group-containing compound, which is an included substance, and a compound resulting from the mutual crosslinking of the (meth)acryloyl group-containing compounds, which are included substances. The included substance as referred to herein means a substance present in the interior of a micelle when an emulsion is formed and a micelle structure is obtained.

As described above, when the compound having a (meth) acryloyl group and the cross-linking agent are allowed to react with each other, a case where the whole of the compound having a (meth)acryloyl group is cross-linked and a case where part of the compound having a (meth)acryloyl group is cross-linked and the rest of the compound having a (meth)acryloyl group remains uncross-linked occur. A catalyst may also be used for further accelerating the aforementioned Michael addition reaction.

Between urethane (meth)acrylate represented by the general formula (1) and the urethane (meth)acrylate obtained by cross-linking the aforementioned urethane (meth)acrylate, urethane (meth)acrylate having a weight average molecular weight of less than 1,500 is an oligomer. In addition, urethane (meth)acrylate having a weight average molecular weight of 1,500 or more is a polymer, and is also included in a photocurable resin which will be described later.

2-5. Photocurable Resin

As the photocurable resin, there can be used a polymer having various photoradical polymerizable groups such as monofunctional, bifunctional, and trifunctional or higher multifunctional polymerizable groups.

The minimum film forming temperature (MFT) of the photocurable resin is preferably 50° C. or less, more preferably 40° C. or less, still more preferably 30° C. or less, far more preferably 20° C. or less, and particularly preferably 5° C. or less, since the abrasion resistance of the photocurable resin is excellent. The MFT refers to a minimum temperature at which a polymer is deformed by heat, and the superiority or inferiority in polymer redispersibility is easily grasped at the MFT compared with at a glass transition temperature (Tg). When the ink composition is excellent in polymer redispersibility, discharge stability is excellent due to the reason that the ink is not attached. In addition, the MFT of the photocurable resin included in the ink composition corresponds to the film forming temperature at which the ink composition begins to form a film.

The MFT in the specification can be measured in accordance with ISO 2115:1996 (title:Plastics-Polymer dispersions-Determination of white point temperature and minimum film-forming temperature).

Furthermore, since the weight average molecular weight of the photocurable resin is excellent in abrasion resistance, the weight average molecular weight is preferably 2,500 or more, and more preferably 2,500 to 10,000. When the weight average molecular weight is 2,500 or more, the weight average molecular weight is sufficiently large at the time of film formation (film preparation). Therefore, it is presumed that the coating film properties (abrasion resistance) are favorable. The presumption does not limit the scope of the invention. In addition, when the minimum film forming temperature and weight average molecular weight of the photocurable resin are respectively in the aforementioned range, abrasion resistance is more excellent, which is preferable.

The photocurable resin are not limited to the following examples, and specific examples of the photocurable resin include a photocurable aliphatic urethane resin, a photocurable aromatic urethane resin, a photocurable acrylic resin, and a photocurable urethane (meth)acrylate. Among these, since the abrasion resistance is more excellent, any one of the photocurable urethane resin and the photocurable acrylic resin is preferable. Among these, since the abrasion resistance is still more excellent, the photocurable urethane resin is more preferable.

Since the photocurable resin has favorable curability and discharge stability, the photocurable resin is preferably included in the ink composition in the dispersed state. In the dispersed state, the photocurable resin is more preferably included in the ink composition in the form of an emulsion (that is, as a photocurable resin emulsion) since curability is more excellent.

When the photocurable resin is included the ink composition in the dispersed state, the photocurable resin may be a compound which functions as a dispersant, and may be a compound which is dispersed by a dispersant or self-dispersion (dispersion). That is, in the specification, the photocurable resin in the dispersed state may be a compound which can constitute a dispersion liquid. Moreover, when the photocurable resin is included in the ink composition in the dispersed state, and the aforementioned predetermined urethane (meth)acrylate and a photocurable resin other than and the urethane (meth)acrylate are included in the ink composition in a dispersed state, the resins may be included in the same dispersed particles (included in the ink composition as the same dispersed particle), or may be included in the respective dispersed particles (included in the ink composition as the respective dispersed particle). Among the resins, because of being excellent in dispersion stability, the latter is preferable.

Examples of the commercially available products of the photocurable resin in the dispersed state include Laromer 8949 (aqueous photocurable aliphatic urethane resin dispersion, MFT=5° C., Mw=2,500, solid content: 60%), Laromer 8983 (aqueous photocurable aromatic urethane resin dispersion, MFT=0° C., Mw=10,000, solid content: 60%), and Laromer 9016 (aqueous photocurable acrylic resin dispersion having a core-shell structure, MFT=0° C., Mw>100,000, solid content: 60%) (above all trade names, manufactured by BASF Japan Ltd.).

On the other hand, the ink composition according to the embodiment may contain the photocurable resin emulsion (polymer emulsion) as described above. The photocurable resin the form of emulsions a film along with drying of the ink landed on the recording medium, and hence the ink is sufficiently fixed on the recording medium to exhibit an effect of abrasion resistance of the image being favorable. Particularly, the photocurable resin emulsion can form a strong film. In addition, the photocurable resin emulsion can make the fixability of the ink more favorable along with the use of wax.

When the photocurable resin is included in the ink composition in the form of emulsion, the photocurable resin may be a compound having emulsifying capacity, or may be a compound included in the ink composition in the form of emulsion together with the compound having emulsifying capacity. That is, in the specification, the photocurable resin in the form of emulsion (photocurable resin emulsion) may be at least any one of a compound (polymerizable compound) having a photopolymerizable group which is an included substance of an emulsion particle, and amphiphilic urethane acrylate which constitutes the outer circumferential of the emulsion and has a photopolymerizable group.

Examples of the photocurable resin emulsion include resin emulsions having the aforementioned specific components as examples.

Examples of the commercially available products of the photocurable resin emulsion include EM-90 (self-emulsifying emulsion of photocurable urethane acrylate, number of functional groups: 6, MFT>50° C., Mw=2,000, solid content: 40%), and EM-92 (self-emulsifying emulsion of photocurable urethane acrylate, number of functional groups: 4, MFT>50° C., Mw=1,700, solid content: 40%) (all above trade manes, manufactured by Arakawa Chemical Industries, Ltd.).

The photocurable resin can be used alone or in combination of two or more kinds thereof.

The content of the photocurable resin is preferably 1% by mass or more to less than 60% by mass in relation to the total mass (100% by mass) of the ink composition, more preferably 5 to 50% by mass, still more preferably 5 to 20% by mass, and far more preferably 5 to 15% by mass since curability and discharge stability are excellent. When a small amount of content is contained in the ink composition, discharge stability is excellent. However, discharge stability depends on the kinds of photocurable resins. For this reason, the upper limit of the content is not limited to the aforementioned range, and a large amount of content in the ink composition is preferable from the viewpoint of being excellent in curability. In addition, the content of the aforementioned predetermined urethane (meth)acrylate and the photocurable resin is preferably 3:1 to 1:2, and more preferably 2:1 to 2:3 since the adhesion and abrasion resistance are more excellent.

3. Urethane (Meth)Acrylate for Fixing

The ink composition according to the embodiment may include a urethane (meth)acrylate for fixing. Thus, when a coating film including an emulsion is formed on a PVC substrate, the fixability (adhesion) of the coating film is made more excellent.

The urethane (meth)acrylate for fixing is different from the aforementioned predetermined urethane (meth)acrylate. In addition, the urethane (meth)acrylate for fixing may be or may be not photocurable.

As described below, the urethane (meth)acrylate for fixing is constituted of a diisocyanate, a diol component having an aromatic skeleton and a hydroxyl group-containing (meth)acrylate.

The weight average molecular weight of the urethane (meth)acrylate for fixing is preferably 1,000 to 10,000 and more preferably 3,000 to 8,000. When the weight average molecular weight is in the aforementioned range, the urethane (meth)acrylate for fixing is excellent in the adhesion of the coating film to the PVC substrate and favorable with respect to the stability of the emulsion. Moreover, in the photocurable urethane (meth)acrylates, urethane (meth)acrylate having a weight average molecular weight of less than 1,500, is included in a photocurable oligomer which will be described later. In addition, urethane (meth)acrylate having a weight average molecular weight of 1,500 or more is included in a photocurable resin.

3-1. Hydroxyl Group-Containing (Meth)Acrylate

The hydroxyl group-containing (meth)acrylate is used for introducing polymerizable groups. Specifically, the hydroxyl group-containing (meth)acrylate used in the embodiment has one or more (meth)acryloyl groups and one hydroxyl group, and the urethanation reaction of the hydroxyl group-containing (meth)acrylate with an isocyanate group introduces one or more (meth)acryloyl groups to each of the both terminals of the main chain of the urethane (meth)acrylate for fixing. The introduction of at least one (meth)acryloyl group enables curing (photopolymerization), and the introduction of two or more (meth)acryloyl groups enables the increase of the curing rate and enables the increase of the hardness of the cured product.

Monohydroxy mono(meth)acrylate is not particularly limited. However, examples of monohydroxy mono(meth)acrylate include 2-hydroxyethyl (meth)acrylate, 2-hydroxypropyl (meth)acrylate, polyethylene glycol mono(meth)acrylate, polypropylene glycol mono(meth)acrylate, polycaprolactone mono(meth)acrylate, glycerol di(meth)acrylate, pentaerythritol tri(meth)acrylate and dipentaerythritol penta(meth)acrylate.

The aforementioned hydroxyl group-containing (meth) acrylate may be used each alone or in combination of two or more kinds thereof.

3-2. Diisocyanate

The diisocyanate is not particularly limited. However, examples of the diisocyanate include diisocyanates having a alicyclic hydrocarbon skeleton such as isophorone diisocyanate, diisocyanates having an aliphatic hydrocarbon skeleton such as hexamethylene diisocyanate, diisocyanates having an aromatic hydrocarbon skeleton such as xylylene diisocyanate, tolylene diisocyanate and diphenylmethane diisocyanate, and diisocyanates having a hydrogenated aromatic hydrocarbon skeleton such as hydrogenated xylylene diisocyanate and hydrogenated diphenylmethane diisocyanate.

Since the cured product of the urethane (meth)acrylate for fixing hardly undergoes yellowing due to sun light (ultraviolet rays), preferable among these diisocyanates are one or more selected from the group consisting of isophorone diisocyanate, hexamethylene diisocyanate, hydrogenated xylylene diisocyanate and hydrogenated diphenylmethane diisocyanate.

The aforementioned diisocyanates may be used intramolecularly or intermolecularly each alone or in combination of two or more kinds thereof.

3-3. Diol Component Having Aromatic Skeleton

As the diol having an aromatic skeleton, known diols having an aromatic skeleton can be used without any particular limitation, as long as the diols have an aromatic structure in the molecule thereof. Specific examples of the diol having an aromatic skeleton include biphenyl-4,4'-diol, 1,4-benzenediol, bisphenol A, ethylene oxide-modified bisphenol A, propylene oxide-modified bisphenol A, aromatic polycarbonate polyol and aromatic polyester polyol.

Preferable among these is aromatic polyester polyol, because of being more favorable in the adhesion to the PVC substrate. Isophthalate is more preferable among aromatic polyester polyols.

The aforementioned diols may be used intramolecularly or inter molecularly each alone or in combination of two or more kinds thereof.

The content of the aforementioned urethane (meth)acrylate for fixing is preferably 0.5 to 4% by mass and more preferably 1 to 3% by mass in relation to the total amount (100% by mass) of the (aqueous) photocurable resin emulsion because of being more excellent in the adhesion to the PVC substrate and the stability after dispersion in water.

4. Photocurable Oligomer and Photocurable Monomer

The ink composition according to the embodiment may contain at least any one of an oligomer and a monomer as a photocurable compound.

The oligomer includes the aforementioned photocurable oligomer. The oligomer is not particularly limited to the following example. However, an example of the oligomer includes an oligomer having a weight average molecular weight of less than 1,500 due to the reason that the oligomer has a structure similar to the structure of the aforementioned photocurable resin and the number of repeating units is small.

The aforementioned monomer is not particularly limited to the following examples, and examples of the monomer include a monomer having a weight average molecular weight of less than 800 and commercially available products as photocurable monomers due to the reason that the number of repeating units is smaller than that of the oligomer.

The photocurable oligomer and monomer may be water-soluble. However, the photocurable oligomer and monomer are preferably in the dispersed state, and more preferably in the form of emulsion. When the water-soluble oligomer and monomer are used, it is preferable to use a water-soluble photopolymerization initiator as a photopolymerization initiator. Meanwhile, when the photocurable oligomer and monomer in the dispersed state are used, the oligomer and monomer can include a non-water-soluble photopolymerization initiator in the particles thereof, and hence, storage stability, discharge stability and curability of the ink composition are more excellent. In the cases of the dispersed state and the form of emulsion, the aforementioned photocurable resin is made into a dispersed state and the form of emulsion, and then, the photocurable resin may be substituted for the photocurable oligomer and monomer. Between the photocurable oligomer and monomer, discharge stability, storage stability, and curability of the ink composition are more excellent, and hence the photocurable oligomer is preferable, the photocurable oligomer in the dispersed state is more preferable, and the photocurable oligomer in the form of emulsion is still more preferable.

5. Non-Photocurable Resin

The ink composition according to the embodiment preferably includes the aforementioned non-photocurable resin. Particularly, when the ink composition is an aqueous ink, it is preferable that the ink composition do not include the aforementioned photocurable compound and include the non-photocurable resin. As the non-photocurable resin, a polymer having polymerizable group can be used.

The non-photocurable resin in the dispersed state is preferable and the non-photocurable resin in the form of emulsion is more preferable. The non-photocurable resin is the same as the photocurable resin as in the "2-5. Photocurable Resin" in the dispersed state and the form of emulsion, except that the non-photocurable resin does not have a photoradical polymerizable group, and the description thereof will be omitted. The minimum film forming temperature (MFT), the glass transition temperature (Tg), and the weight average molecular weight of the non-photocurable resin fall in the preferable range described in the section of the photocurable resin, the description thereof will be omitted.

The non-photocurable resin in the form of emulsion (hereinafter also referred to as "non-photocurable resin emulsion") will be described in detail below.

The non-photocurable resin emulsion does not limited to the following examples, and examples of the non-photocurable resin emulsion include homopolymers or copolymers of (meth)acrylate, (meth)acrylate ester, acrylonitrile, cyanoacrylate, acrylamide, olefin, styrene, vinyl acetate, vinyl chloride, vinyl alcohol, vinyl ether, vinylpyrrolidone, vinylpyridine, vinylcarbazole, vinylimidazole, and vinylidene chloride, fluororesin; and natural resin. Among these, at least any one of (meth) acrylic resin and styrene-(meth)acrylic acid copolymer resin is preferable, at least any one of acrylic resin and styrene-acrylic acid copolymer resin is more preferable, and styrene-acrylic acid copolymer resin is still more preferable. In addition, the copolymers may be used in any form of random copolymer, block copolymer, alternating copolymer, and graft copolymer.

The non-photocurable resin emulsion may be obtained by using known materials and known methods, and commercially available products may be also used. The commercially available products are not particularly limited to the following examples and examples of the commercially available products include MICROGEL E-1002, MICROGEL E-5002 (trade names, manufactured by NIPPON PAINT Co., Ltd.), VONCOAT 4001, VONCOAT 5454 (trade names, manufactured by DIC Corporation), SAE1014 (trade name, manufactured by ZEON CORPORATION), SAIVINOL SK-200

(trade name, manufactured by Saiden Chemical Industry Co., Ltd.), and JONCRYL 7100, JONCRYL 390, JONCRYL 711, JONCRYL 511, JONCRYL 7001, JONCRYL 632, JONCRYL 741, JONCRYL 450, JONCRYL 840, JONCRYL 74J, JONCRYL HRC-1645J, JONCRYL 734, JONCRYL 852, JONCRYL 7600, JONCRYL 775, JONCRYL 537J, JONCRYL 1535, JONCRYL PDX-7630A, JONCRYL 352J, JONCRYL 352D, JONCRYL PDX-7145, JONCRYL 538J, JONCRYL 7640, JONCRYL 7641, JONCRYL 631, JONCRYL 790, JONCRYL 780, JONCRYL 7610 (trade names, manufactured by BASF Japan Ltd.).

When the non-photocurable resin emulsion is contained, the content (in terms of solid content) thereof is preferably 0.5 to 20% by mass, and more preferably 1 to 15% by mass, in relation to the total mass of the ink. When the content is in the aforementioned range, the solid content concentration can be decreased, and hence, discharge stability is more favorable in some cases.

6. Polyether-Modified Silicone Oil

The ink composition according to the embodiment includes a polyether-modified silicone oil that is soluble in a solvent having an SP value in a predetermined range. Accordingly, the ink composition is excellent in at least solid filling properties, storage stability, and abrasion resistance. Here, the polyether-modified silicone oil can be used as a surface control agent having a siloxane structure.

Here, the polyether-modified silicone oil included in the ink composition may be used alone or in combination of two or more kinds thereof. Then, at least one of the polyether-modified silicone oils may be dissolved in the solvent in which the SP value is the lower limit of 8.5 or less and the upper limit of 18.0 or more. Accordingly, when two or more kinds of polyether-modified silicone oils are included in the ink composition, as long as at least one of these polyether-modified silicone oils is soluble in the solvent in which the SP value satisfies the lower limit and the upper limit, the SP value of the other kinds of polyether-modified silicone oils is not particularly limited. In the specification, when simply the "polyether-modified silicone oil" is mentioned, the "polyether-modified silicone oil" means both the polyether-modified silicone oil in which the SP value satisfies the ranges of the upper limit and the lower limit and the polyether-modified silicone oil in which the SP value does not satisfy the ranges of the upper limit and the lower limit, unless particularly otherwise noted.

In the specification, the "SP value" refers to a compatibilizing parameter, and also can refer to a solubility parameter. The SP value means a value calculated using a Hansen equation as shown below. The Hansen solubility parameter is expressed in a three-dimensional space by dividing the solubility parameter introduced by Hildebrand into three components of a dispersion term δd, a polarity term δp, and a hydrogen bonding term δh. In the specification, the SP value is represented by $\delta[(cal/cm^3)^{0.5}]$, and the value calculated using the following equation is used.

$$\delta[(cal/cm^3)^{0.5}] = (\delta d^2 + \delta p^2 + \delta h^2)^{0.5}$$

Here, the values of the dispersion term δd, the polarity term δp, and the hydrogen bonding term δh are calculated in many cases by Hansen and his successors, and details are described in Polymer Handbook (fourth edition), VII-698 to 711. Further, the Hansen solubility parameter values of a large number of solvents or resins have been calculated and are described in Industrial Solvents Handbook (Wesley L. Archer).

In the specification, the term of "soluble" is determined by the following method. First, solvents having different SP values such as n-hexane (SP value: 7.24), acetone (SP value: 9.75), water (SP value: 23.4), and a mixed liquid of n-hexane and acetone and a mixed liquid of acetone and water, are prepared. The mixed liquids can be defined as various liquids having weighted average values (SP values) at a mixed ration of the SP values of the solvents which are mixed at different mixing ratios. 1% by mass of polyether-modified silicone oil is added to each of the solvents to prepare solutions with a total mass of 100% by mass. Then, when aggregates are not formed in these solutions, the polyether-modified silicone oil included in each of the solvents is determined to be soluble in the solvent in each of the solvents. The determination is performed by visual observation. However, when visual observation cannot be performed, a spectrophotometer is used for observation and when the value shown by the spectrophotometer is fixed, it can be said that the polyether-modified silicone oil is soluble.

The advantageous effect obtained by respectively setting the lower limit and the upper limit of the SP value to predetermined values is to obtain the ink composition excellent in at least solid filling properties, storage stability, abrasion resistance as described above. This is because the polyether-modified silicone oil excellent in balance between hydrophilicity and hydrophobicity (having a good balance between hydrophilicity and hydrophobicity) is included in the ink composition due to having a wide solubility range.

In other words, discharge stability is correlated to ease of ink bubbling, and when the polyether-modified silicone oil is hydrophilic, ink bubbling easily occur. In addition, in order to have favorable solid filling properties onto the recording medium, the content of the hydrophilic polyether-modified silicone oil in the ink composition is increased, ink bubbling more easily occur, and hence, discharge stability id deteriorated. Then, by using the polyether-modified silicone oil excellent in balance between hydrophilicity and hydrophobicity, ink bubbling does not easily occur, to be excellent in discharge stability.

The lower limit of the SP value is 8.5 or less, preferably 8.0 or less, and more preferably 7.8 or less. When the lower limit is in the aforementioned range, all of solid filling properties, discharge stability, and storage stability are excellent. On the other hand, the upper limit of the SP value is 18.0 or more, preferably 19.0, and more preferably 20.0 or more. When the upper limit is in the aforementioned range, storage stability is excellent.

The polyether-modified silicone oil is not particularly limited to the following examples and examples of the polyether-modified silicone oil include polyethylene oxide-modified silicone and polyethylene oxide-polypropylene oxide-modified silicone. Among these, in order for the SP value to fall a predetermined range, the polyethylene oxide-modified silicone, that is, a silicone oil having a polyethylene oxide-modified group is preferable.

Between the aforementioned polyethylene oxide-modified silicones, a compound represented by the general formula (A) described later is more preferable.

Examples of the commercially available products of the polyether-modified silicone oil include BYK-345, BYK-346, BYK-347 (SP value range: 11 to 15), BYK-348 (SP value range: 13 to 23), BYK-349 (SP value range: 7.7 to 20) (above all trade names, manufactured by BYK-Chemie Japan KK), PD570 (trade name, manufactured by Nissin Chemical Industry Co., Ltd., SP value range: 13 to 23), KF-351, KF-352, KF-353, KF-615A (above all trade names, manufactured by Shin-Etsu Chemical Co., Ltd.), BY-16-004, SH3746, and SF8410 (above all trade names, manufactured by Dow Corning Toray Co., Ltd.).

The SP values with some of the aforementioned commercially available products means that the commercially available products are soluble in the solvents having the SP values.

The ink composition according to the embodiment includes at least the polyether-modified silicone oil that is soluble in the solvent in which the lower limit of SP value is 8.5 or less and the upper limit thereof is 18.0 or more. In addition, it can said that the polyether-modified silicone oil in which the SP value calculated by the method for determining whether the polyether-modified silicone oil is "soluble" satisfies the aforementioned range of the upper limit and the lower limit, is a component necessarily included in the ink composition according to the embodiment. An example of the polyether-modified silicone oil that is soluble in the solvent in which the lower limit of the SP value is 8.5 or less and the upper limit is 18.0 or more includes BYK-349.

The surface tension of the polyether-modified silicone oil is preferably 19 to 25 mN/m, and more preferably 20 to 23 mN/m, since wettability and spreadability of the ink composition onto the recording medium, and solubility of the polyether-modified silicone oil in the ink composition are more excellent. As examples of the surface tension of the polyether-modified silicone oil, BYK-347 is 21.7 mN/m, BYK-348 is 22.4 mN/m, BYK-349 is 22.1 mN/m, and PD570 is 25.8 mN/m. Here, the surface tension of the polyether-modified silicone oil means the surface tension of a liquid obtained by mixing the polyether-modified silicone oil with concentration of 1% by mass in pure water at a room temperature.

Here, a modification example of the polyether-modified silicone oil according to the embodiment will be described. The modification example relates to an ink composition for ink jet recording which contains the coating film forming material, polyether-modified silicone oil, and water, and in which the polyether-modified silicone oil is at least a compound represented by the general formula (A).

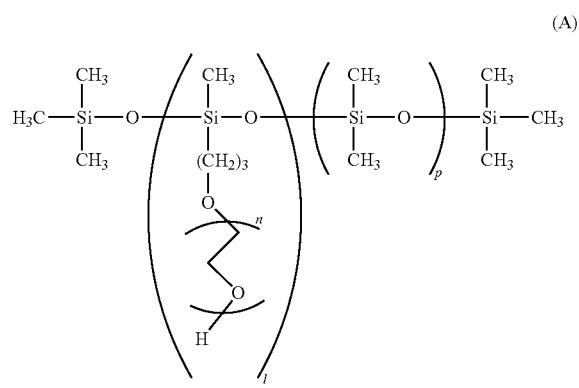

(A)

The number of repeating units in the general formula (A) will be described. First, l refers to 6 to 12, preferably 7 to 11, and more preferably 8 to 10. In addition, n refers to 3 to 12, preferably 4 to 11, and more preferably 5 to 10. Furthermore, p is 25 or less, preferably 3 to 25, and more preferably 5 to 23. When l, n and p are in the preferable range, solid filling properties, storage stability and abrasion resistance of the ink composition are more excellent.

As described above, since the polyether-modified silicone oil included the ink composition according to the embodiment is at least a compound represented by the general formula (A), without consideration of the SP value, solid filling properties, storage stability and abrasion resistance of the ink composition are excellent.

Furthermore, when l, n and p are in the preferable range, the SP value is allowed to be in the aforementioned predetermined range. An example of the compound represented by the general formula (A) includes BYK-349 described above.

The ink composition according to the embodiment preferably includes at least one compound represented by the general formula (A) as the polyether-modified silicone oil, and the polyether-modified silicone oil is preferably one or more kinds of the compounds represented by the general formula (A).

In such a manner, even when the polyether-modified silicone oil is not based on the index of the aforementioned SP value, the surface tension of the ink composition is descreased and wettability and spreadability onto the recording medium can be favorable.

In addition, the contents described in the embodiment are applied to additives (components) included or possibly included in the ink composition according to the embodiment other than the polyether-modified silicone oil.

7. (Aqueous) Photocurable Resin Emulsion

The aforementioned photocurable compounds, which are preferably in the dispersed state, and more preferably in the form of emulsion, are included in the ink composition according to the embodiment. When these emulsions are emulsions including at least the aforementioned predetermined urethane (meth)acrylate, curability, storage stability and discharge stability of the ink composition are more excellent. The photocurable resin emulsion including the aforementioned predetermined urethane (meth)acrylate will be described below.

In the ink composition according to the embodiment, as the photocurable compound, a(n) (aqueous) photocurable resin emulsion is preferably formed by at least the aforementioned predetermined urethane (meth)acrylate, and the photoradical polymerization initiator described later. In this case, the ink composition is excellent in curability based on irradiation of ultraviolet rays in the presence of a solvent (particularly, water and water-soluble organic solvent) and odor can be effectively suppressed. The (aqueous) photocurable resin emulsion may be composed of other photocurable compounds and the photoradical polymerization initiator emulsified and dispersed in a solvent by the aforementioned predetermined urethane (meth)acrylate.

Curability is excellent by including at least a photoradical polymerization initiator and a photocurable compound in an emulsion of an amphiphilic linear urethane (meth)acrylate. The aforementioned urethane (meth)acrylate is an amphiphilic substance, and hence adoption of the linear structure for the molecular structure of the urethane (meth)acrylate can obtain a(n) (aqueous) photocurable rein emulsion achieving advantageous effects such that the emulsion is stable and excellent in dispersibility, and is low in viscosity.

It is considered that the aforementioned effects due to the (aqueous) photocurable resin emulsion are brought about by the following reasons.

FIG. 1 is a schematic diagram macroscopically illustrating a(n) (aqueous) photocurable resin emulsion, and FIG. 2 is a schematic diagram microscopically illustrating the (aqueous) photocurable resin emulsion. As shown in FIGS. 1 and 2, it is considered that the urethane (meth)acrylate forms micelles in water in such a manner that the hydrophobic moiety is directed toward the core and the hydrophilic moiety is directed toward the water phase to form the shell layer, and thus it can be considered that the urethane (meth)acrylate forms in water micelles including the photocurable compound (preferably radical polymerizable (meth)acrylate) and the photoradical polymerization initiator.

It is considered that such a micelle formation as described above is ascribable to the molecular structure of the urethane (meth)acrylate. Specifically, at the time of the micelle formation, the molecular structure of the urethane (meth)acrylate is smaller in steric hindrance as compared to the case where the main chain is branched or the main chain has hydrophobic moieties at both terminals thereof, and is considered to be free from bend conformation. Accordingly, it is possible that the urethane (meth)acrylate is regularly densely oriented with the hydrophilic moiety directed toward the water phase. Thus, in the micelle in which the urethane (meth)acrylate molecules are densely oriented, the hydrogen bonds between the urethane bonds operate effectively to increase the micelle formation strength (packing property) so as to probably contribute to the stability and the dispersibility of the micelles.

Therefore, the (aqueous) photocurable resin emulsion is excellent in stability and a favorable photopolymerizability is obtained even when the (aqueous) photocurable resin compound (preferably, radical polymerizable (meth)acrylate) and the photoradical polymerization initiator are included in the micelles.

As for the (aqueous) photocurable resin emulsion, a person having ordinary skill in the art may select appropriate methods by appropriately improving and modifying the methods performed in the below described examples; thus, known methods such as emulsion polymerization, high pressure emulsification and phase inversion emulsification may be adopted. Within the range not impairing the advantageous effects of the invention, known various emulsifying agents and dispersants may also be used as necessary.

The emulsion polymerization method is a method in which an amphiphilic substance such as a surfactant is added in the water phase, and then an oil phase is added to the water phase. The high pressure emulsification method is a method in which a water phase, an oil phase and an amphiphilic substance such as a surfactant are mixed in advance, and the resulting mixture is emulsified with a high pressure emulsifying machine such as a homogenizer to obtain an aqueous resin emulsion. The inversion emulsification method is a method in which an amphiphilic substance such as a surfactant is dissolved or dispersed in an oil phase, and a water phase is added to the oil phase to obtain an O/W type emulsion. The continuous phase is changed from water to oil (inverse phase) midway through the emulsification, and hence the emulsification is referred to as the phase inversion emulsification. Here, the aforementioned surfactant is not limited to the following examples, and examples of the surfactant include sodium alkylsulfonate, alkyl sulfate ester sodium, alkyl ether sulfate ester sodium, polyoxyethylene alkyl ether, polyoxyethylene alkyl phenyl ether, alkylamino fatty acid sodium salt and alkyl trimethyl ammonium salt.

In the ink composition according to the embodiment, when at least any one of the urethane (meth)acrylate represented by the general formula (1) and the cross-linked urethane (meth)acrylate, the photocurable compound and the photoradical polymerization initiator constitute the (aqueous) photocurable resin emulsion, the average particle size of the emulsion is preferably 30 to 2,000 nm and more preferably 50 to 1,000 nm. When the average particle size of the (aqueous) photocurable resin emulsion is in the aforementioned range, the ejection stability is more favorable.

The average particle size of the (aqueous) photocurable resin emulsion can be regulated by changing the molecular sizes of the urethane (meth)acrylate represented by the general formula (1) and the cross-linked urethane (meth)acrylate. Accordingly, the materials of the urethane (meth)acrylate represented by the general formula (1) and the cross-linked urethane (meth)acrylate may be appropriately changed. The average particle size of the (aqueous) photocurable resin emulsion can also be regulated by a known method; for example, the stirring speed, the emulsifying agent or the like at the time of preparation of the (aqueous) photocurable resin emulsion may be appropriately improved or changed.

The average particle size in the specification means the particle size at cumulative 50% by volume and is measured by the dynamic light scattering method. The average particle size can be measured, for example, by using the Microtrac UPA150 (trade name, manufactured by Microtrac Inc.).

When the (aqueous) photocurable resin emulsion is prepared by using the cross-linked urethane (meth)acrylate, any one of the emulsion formation and the cross-linking reaction may come first. In particular, when the cross-linking reaction follows the establishment of the emulsified state, gelification can be effectively prevented, and hence, it is preferable to perform the cross-linking reaction in the emulsion state following emulsification.

The counterpart of the cross-linking reaction by the cross-linking agent is not limited to the urethane (meth)acrylate represented by the general formula (1), but may also be other included substances such as the aforementioned compound having three or more (meth)acryloyl groups in the molecule thereof.

As described above, the ink composition including the (aqueous) photocurable resin emulsion using the urethane (meth)acrylate is low in viscosity, excellent in curability, photocurable in the presence of water, and additionally excellent in hydrolysis resistance. In particular, in the form in which the photocurable compound and the photoradical polymerization initiator are included in the micelles formed by the aforementioned urethane (meth)acrylate, the (aqueous) photocurable resin emulsion can acquire the excellent curability and the performance of being photocurable even in the presence of a predetermined concentration of water, wherein such performance is not found in (aqueous) photocurable resin emulsions in the related art. The urethane (meth)acrylate forming the micelles of the (aqueous) photocurable resin emulsion is capable of densely orienting due to the structure thereof, and it is considered that strong bonding force due to hydrogen bond operates between the arranged urethane (meth)acrylate molecules since the urethane (meth)acrylate has the urethane bonds (urethane groups) in the hydrophobic moiety in the structure thereof. Due to this, it is considered that there has been obtained a stable emulsion in which the included substances in the micelles hardly leak and hydrolysis hardly occurs.

The reasons for the fact that the (aqueous) photocurable resin emulsion is excellent in photopolymerizability (curability) and additionally is polymerized (cured) with light even in the presence of a predetermined concentration of water are not yet clear. However, the reasons are inferred as follows. As described above, the (aqueous) photocurable resin emulsion is in the state such that the aforementioned urethane (meth)acrylate forms in water spherical micelles including the compound having a radical polymerizable group and the photoradical polymerization initiator in the core thereof, and in this state, light irradiation does not cause polymerization (curing). When the (aqueous) photocurable resin emulsion is applied to a recording medium and dried so as to have a predetermined concentration, light irradiation can cause polymerization (curing) even in the state such that water remains, and thus a favorable adhesion to the recording medium can be obtained. This is presumably because the decrease of the water concentration allows the spherical micelles to form a lamellar structure under the state that the spherical micelles hold the photocurable compound and the photoradical polymerization initiator in the interior thereof, and irradiation of the lamellar structure with light allows the photoradical polymerization initiator in the interior of the lamellar structure to be the initiator radical, and the initiator radical attacks the compound having a radical polymerizable group and the acryloyl group of the urethane (meth)acrylate in the homogeneous field to cause a chain reaction. This presumption is made for the purpose of describing the curability of the (aqueous) photocurable resin emulsion, but is not construed to limit the (aqueous) photocurable resin emulsion in the embodiment.

8. Photopolymerization Initiator

The ink composition according to the embodiment may include a photopolymerization initiator. The photopolymerization initiator is used for making the ink present on the surface of the recording medium by ultraviolet irradiation cured to form an image. Among the radiations, the use of ultraviolet rays (UV) exhibits excellent safety and can suppress the cost of a light source lamp. The photopolymerization initiator is not limited as long as active species such as radical or cation are produced by light (ultraviolet ray) energy to initiate polymerization of the polymerizable compounds. However, a photo-radical polymerization initiator and a photo-cationic polymerization initiator can be used, and particularly, the photo-radical polymerization initiator is preferably used.

Examples of the photo-radical polymerization initiator include aromatic ketones, acylphosphine oxide compounds, aromatic onium salt compounds, organic peroxides, thio compounds (thioxanthone compounds, thiophenyl group-containing compounds, and the like), hexaaryl biimidazole compounds, ketoxime ester compounds, borate compounds, azinium compounds, metallocene compounds, active ester compounds, compounds having carbon-halogen bonds, and alkylamine compounds.

Among these, at least any one of the acylphosphine oxide compounds and the thioxanthone compounds is preferably used, the acylphosphine oxide compounds are more preferably used, and the acylphosphine oxide compounds are still more preferably used in combination with the thioxanthone compounds, particularly, because the curability of an ink can be further improved.

Specific examples of the photoradical polymerization initiator include acetophenone, acetophenone benzyl ketal, 1-hydroxycyclohexyl phenyl ketone, 2,2-dimethoxy-2-phenyl acetophenone, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, Michler's ketone, benzoin propyl ether, benzoin ethyl ether, benzyl dimethyl ketal, 1-(4-isopropylphenyl)-2-hydroxy-2-methylpropan-1-one, 2-hydroxy-2-methyl-1-phenylpropan-1-one, thioxanthone, diethylthioxanthone, 2-isopropylthioxanthone, 2-chlorothioxanthone, 2-methyl-1-[4-(methylthio) phenyl]-2-morpholino-propan-1-one, bis(2,4,6-trimethylbenzoyl)-phenylphosphine oxide, 2,4,6-trimethylbenzoyl-diphenyl-phosphine oxide, 2,4-diethylthioxanthone, and bis-(2,6-dimethoxybenzoyl)-2,4,4-trimethylpentyl phosphine oxide.

Examples of commercially available products of the photoradical polymerization initiator include IRGACURE 651 (2,2-dimethoxy-1,2-diphenylethan-1-one), IRGACURE 184 (1-hydroxy-cyclohexyl-phenyl-ketone), DAROCUR 1173 (2-hydroxy-2-methyl-1-phenyl-propan-1-one), IRGACURE 2959 (1-[4-(2-hydroxyethoxy)-phenyl]-2-hydroxy-2-methyl-1-propan-1-one), IRGACURE 127 (2-hydroxy-1-{4-[4-(2-hydroxy-2-methyl-propionyl)-benzyl]phenyl]-2-methyl-propan-1-one}, IRGACURE 907 (2-methyl-1-(4-methylthiophenyl)-2-morpholinopropan-1-one), IRGACURE 369 (2-benzyl-2-dimethylamino-1-(4-morpholinophenyl)-butanone-1), IRGACURE 379 (2-(dimethylamino)-2-[(4-methylphenyl)methyl]-1-[4-(4-morpholinyl)phenyl]-1-butanone), DAROCUR TPO (2,4,6-trimethylbenzoyl-diphenyl-phosphine oxide), IRGACURE 819 (bis(2,4,6-trimethylbenzoyl)-phenylphosphine oxide), IRGACURE 819DW (bis-2,4,6-trimethylbenzoyl)-phenylphosphine oxide), IRGACURE 784 (bis($\eta$5-2,4-cyclopentadien-1-yl)-bis(2,6-difluoro-3-(1H-pyrrol-1-yl)-phenyl)titanium), IRGACURE OXE 01 (1.2-octanedione, 1-[4-(phenylthio)-, 2-(O-benzoyloxime)]), IRGACURE OXE 02 (ethanone, 1-[9-ethyl-6-(2-methylbenzoyl)-9H-carbazol-3-yl]-, 1-(O-acetyloxime)), and IRGACURE 754 (mixture of oxyphenylacetic acid, 2-[2-oxo-2-phenylacetoxyethoxy]ethyl ester and oxyphenylacetic acid, and 2-(2-hydroxyethoxy)ethyl ester) (above all manufactured by BASF Japan Ltd.), KAYACURE DETX-S (2,4-diethylthioxanthone) (trade name, manufactured by Nippon Kayaku Co., Ltd.), Lucirin TPO, LR8893, and LR8970 (manufactured by BASF Japan Ltd.), and UBECRYL P36 (manufactured by UCB S.A.).

These photopolymerization initiators may be used alone or in combination of two or more kinds.

The content of the photopolymerization initiator is preferably 3 to 15% by mass in relation to the total mass (100% by mass) of the ink composition in order to exhibit the sufficient ultraviolet curing rate, avoid the photopolymerization initiator from remaining undissolved and avoid coloring due to the photopolymerization initiator.

9. Solvent

The ink composition according to the embodiment may include at least water and may further include an organic solvent as a solvent.

9-1. Water

The water is not particularly limited, and there can be used pure water or ultrapure water such as ion exchanged water, ultrafiltered water, reverse osmotic water and distilled water. The content of the water is not particularly limited and may be appropriately determined as necessary. It is preferable to contain water from the viewpoint of environmentally friendly ink with less organic solvent and good dispersibility of the photocurable compound.

9-2. Organic Solvent

Among the organic solvents, a water-soluble organic solvent is preferable. Furthermore, the use of a water-soluble organic solvent with water is preferable. The inclusion of the water-soluble organic solvent in the ink composition enables to prevent the clogging in the vicinity of the nozzles of the ink jet head, to appropriately control the permeability of the ink into the recording medium or the spreading of the ink on the recording medium, and to provide the ink with drying property.

Because there are obtained advantageous effects such as the stable discharge stability free from dot loss, appropriate wetness and spreading on a wide range of media, the water-soluble organic solvent preferably includes at least any one of a polar solvent and a permeable solvent.

The polar solvent is not particularly limited, and examples of the polar solvent include 2-pyrrolidone, N-methylpyrrolidone, ε-caprolactam, dimethyl sulfoxide, sulfolane, morpholine, N-ethylmorpholine and 1,3-dimethyl-2-imidazolidine. The addition of the polar solvent provides an effect to improve the dispersibility of the capsulated pigment particles in the ink composition and enables to improve the discharge stability of the ink.

The polar solvent is preferably a heterocyclic compound, and preferable among these are 2-pyrrolidone, N-methylpyrrolidone, pyrrole, furan, thiophene, imidazole, oxazole, thiazole, pyrazole, isoxazole, isothiazole, pyridine, pyridazine, pyrimidine, pyrazine, piperidine, piperazine, morpholine, 2H-pyran and 4H-pyran; 2-pyrrolidone is more preferable.

The permeable solvent is not particularly limited, and examples of the permeable solvent include 1,2-alkanediol, acetylene glycol, alkylene glycol, alkylene glycol alkyl ether and glycol ether. As compared to the use of permeable solvents other than 1,2-alkanediol, the use of 1,2-alkanediol enables the more efficient reduction of the coalescence in the recorded matter when printing is made on the recording medium scarcely absorbing or not absorbing ink, such as paper used in running on or a plastic film. Among the 1,2-alkanediols, particularly, 1,2-hexanediol remarkably exhibits such an effect.

The water-soluble organic solvent preferably includes one or more selected from the group consisting of 2-pyrrolidone, glycol ether, 1,2-alkanediol, alkylene glycol and alkylene glycol alkyl ether.

1,2-Alkanediol is not particularly limited, and specific examples of 1,2-alkanediol include 1,2-octanediol, 1,2-hexanediol, 1,2-pentanediol and 4-methyl-1,2-pentanediol.

Alkylene glycol is not particularly limited, and specific examples of alkylene glycol include ethylene glycol, diethylene glycol, triethylene glycol, tetraethylene glycol, propylene glycol and dipropylene glycol monomethyl ether.

Moreover, alkylene glycol alkyl ether which is liquid under ordinary temperature and pressure is not particularly limited, and an example of the alkylene glycol alkyl ether includes ethylene glycol monomethyl ether.

The organic solvents may be used each alone or in combination of two or more kinds. When the organic solvent is not used with water, other organic solvents other than the water-soluble organic solvent may be used.

In order to secure appropriate physical property values (such as viscosity) of ink, appropriate printing quality and reliability, the water-soluble solvent is preferably included in a content of 1 to 40% by mass and more preferably in a content of 2 to 30% by mass in relation to the total amount (100% by mass) of the ink composition.

10. Fluorescent Brightening Agent

The ink composition according to the embodiment may include a fluorescent brightening agent. Due to this, the curability is more excellent.

The fluorescent brightening agent is classified as a sensitizer. The fluorescent brightening agent is a colorless or slightly colored compound capable of absorbing light having a peak wavelength approximately in a range from near ultraviolet to a short wavelength (visible light), namely, a wavelength range from 300 to 450 nm and capable of emitting fluorescence having a peak wavelength approximately in a range from 400 to 500 nm. The fluorescent brightening agent is also known as the fluorescent whitening agent. The physical principles and the chemical properties of the fluorescent brightening agent are described in Ullmann's Encyclopedia of Industrial Chemistry, Sixth Edition, Electronic Release, Wiley-VCH, 1998.

The fluorescent brightening agent is excited to an excited state with an active energy ray and can accelerate the generation of useful groups such as radicals and acids due to the interactions such as energy transfer and electron transfer with other substances such as radical generating agents and acid generating agents. An example of the case of the occurrence of such interactions include a case where the energy level of the triplet excited state of the fluorescent brightening agent molecule and the energy level of the triplet excited state of the radical generating agent or the acid generating agent are extremely close to each other, and additionally, the energy level of the triplet excited state of the radical generating agent or the acid generating agent is slightly lower than the energy level of the triplet excited state of the fluorescent brightening agent. Actually, it is necessary that the fluorescent brightening agent be capable of capturing the irradiation light in a wavelength band of from 350 nm to 450 nm, and additionally, the energy level of the triplet excited state of the fluorescent brightening agent have the aforementioned predetermined relation with the energy level of the triplet excited state of the radical generating agent or the acid generating agent. In order to meet this requirement, it is necessary that the energy level of the singlet exited state and the energy level of the triplet excited state be close to each other. Accordingly, also included is the case where the fluorescent brightening agent is used from the viewpoint of the interaction with the radical generating agent or the acid generating agent, and at the same time, the absorption wavelength band of the photoradical polymerization initiator overlaps with the absorption wavelength band of the fluorescent brightening agent from the viewpoint of the generation efficiency, as the ink liquid, of the radical or acid with respect to the irradiation wavelength. In this case, the fluorescent brightening agent in the present embodiment has an absorption region in the wavelength band at least partially overlapping with the absorption wavelength band of the photoradical polymerization initiator, capable of performing cleavage thereof.

The fluorescent brightening agent is not particularly limited, and examples of the fluorescent brightening agent include naphthalene benzoxazolyl derivatives, thiophene benzoxazolyl derivatives, stilbene benzoxazolyl derivatives, coumarin derivatives, styrene biphenyl derivatives, pyrazolone derivatives, stilbene derivatives, styryl derivatives of benzene and biphenyl, bis(benzazol-2-yl) derivatives, carbostyrils, naphthalimides, derivatives of dibenzothiophene-5,5'-dioxide, pyrene derivatives and pyridotriazoles. These may be used each alone or in combination of two or more kinds thereof.

Examples of the commercially available product of the fluorescent brightening agent include TINOPAL OB manufactured by BASF Japan Ltd. and HOSTALUX KCB (1,4-bis (2-benzoxazolyl)naphthalene) manufactured by Clariant (Japan) K.K.

The fluorescent brightening agent has a feature such that the maximum absorbance of the fluorescent brightening agent per a predetermined concentration in a wavelength band of from 360 nm to 420 nm is larger than the maximum absorbance per the same concentration as the aforementioned predetermined concentration of the photoradical polymerization initiator in the aforementioned wavelength band. The inventors have found that the fulfillment of the feature results in an ink composition extremely excellent in curability.

In the design method for allowing the photoradical polymerization initiator and the fluorescent brightening agent to fulfill the aforementioned feature, the absorption spectrum, and the maximum absorbance and the peak wavelength of the absorption spectrum of each of the photoradical polymerization initiator to be used and the fluorescent brightening agent to be used are analyzed. Then, it is only checked to verify whether or not the relation between the maximum absorbance of the photoradical polymerization initiator and the maximum absorbance of the fluorescent brightening agent fulfills the aforementioned feature.

When an ultraviolet ray-emitting diode (LED) is used as the light source used for measuring the absorption spectra of the fluorescent brightening agent and the photoradical polymerization initiator, LEDs having a light emission peak in a wavelength band of from 360 nm to 420 nm can be used. The wavelength of the LED is not limited to the wavelength in the case where a single LED is used, and plural LEDs may be used in combination so as for the light source to have plural light emission peaks. For example, LEDs respectively having the peak wavelengths of 365 nm, 385 nm, 395 nm and 405 nm may be used in combinations of two or more thereof.

The fluorescent brightening agents may be used each alone or in combination of two or more kinds thereof. The fluorescent brightening agent is included preferably in a content of 0.01% by mass to 0.5% by mass in relation to the total mass (100% by mass) of the aqueous photocurable resin emulsion. When the content is in the aforementioned range, the photocurability is favorable, and the effect of the fluorescent brightening agent itself possibly exerting on the hue of the cured film can be reduced.

11. Colorant

The ink composition according to the embodiment may further include the colorant. As the colorant, at least one of a pigment and a dye can be used.

11-1. Pigment

In the embodiment, the weather resistance of the ink composition can be improved by using a pigment as the colorant. As the pigment, any one of an inorganic pigment or an organic pigment can be used.

Examples of the inorganic pigment to be used include carbon black (C.I. Pigment Black 7) such as furnace black, lamp black, acetylene black, and channel black, iron oxide, and titanium oxide.

Examples of the organic pigment to be used include azo pigments such as insoluble azo pigments, condensed azo pigments, azo-lakes, and chelate azo pigments, polycyclic pigments such as phthalocyanine pigments, perylene and perynone pigments, anthraquinone pigments, quinacridone pigments, dioxane pigments, thioindigo pigments, isoindolinone pigments, and quinophthalone pigments, dye chelates (for example, basic dye-type chelates and acid dye-type chelates), dye lakes (basic dye-type lakes and acid dye-type lakes), nitro pigments, nitroso pigments, aniline black, and daylight fluorescent pigments.

In further detail, examples of carbon black used as a black ink include No. 2300, No. 900, MCF88, No. 33, No. 40, No. 45, No. 52, MA7, MA8, MA100, and No. 2200B (above all manufactured by Mitsubishi Chemical Corporation), Raven 5750, Raven 5250, Raven 5000, Raven 3500, Raven 1255, and Raven 700 (above all manufactured by Carbon Columbia Corporation), Regal 400R, Regal 330R, Regal 660R, Mogul L, Monarch 700, Monarch 800, Monarch 880, Monarch 900, Monarch 1000, Monarch 1100, Monarch 1300, and Monarch 1400 (above all manufactured by CABOT JAPAN K.K.), and Color Black FW1, Color Black FW2, Color Black FW2V, Color Black FW18, Color Black FW200, Color Black S150, Color Black S160, Color Black S170, Printex 35, Printex U, Printex V, Printex 140U, Special Black 6, Special Black 5, Special Black 4A, and Special Black 4 (above all manufactured by Degussa).

Examples of a pigment used as a white ink include C.I. Pigment White 6, 18, and 21.

Examples of a pigment used as a yellow ink include C.I. Pigment Yellow 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Examples of a pigment used as a magenta ink include C.I. Pigment Red 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, and 245, and C.I. Pigment Violet 19, 23, 32, 33, 36, 38, 43, and 50.

Examples of a pigment used as a cyan ink include C.I. Pigment Blue 1, 2, 3, 15, 15:1, 15:2, 15:3, 15:34, 15:4, 16, 18, 22, 25, 60, 65, and 66, and C.I. Vat Blue 4 and 60.

Examples of pigments other than magenta, cyan, yellow include C.I. Pigment Green 7 and 10, C.I. Pigment Brown 3, 5, 25, and 26, C.I. Pigment Orange 1, 2, 5, 7, 13, 14, 15, 16, 24, 34, 36, 38, 40, 43, and 63.

These pigments may be used alone or in combination of two or more kinds.

When the pigments are used, the average particle size thereof is not particularly limited as below. However, the average particle size of 300 nm or less is preferable and the average particle size of 50 to 200 nm is more preferable. When the average particle size is in the aforementioned range, reliability such as discharge reliability and dispersion stability of the ink composition is more excellent and an image having an excellent quality can be formed. Here, the average particle size in the specification is measured by the dynamic light scattering method.

11-2. Dye

In the embodiment, a dye can be used as the colorant. The dye is not particularly limited, and an acid dye, a direct dye, a reactive dye, and a basic dye can be used. Examples of the dye include C.I. Acid Yellow 17, 23, 42, 44, 79, and 142, C.I. Acid Red 52, 80, 82, 249, 254, and 289, C.I. Acid Blue 9, 45, and 249, C.I. Acid Black 1, 2, 24, and 94, C.I. Food Black 1 and 2, C.I. Direct Yellow 1, 12, 24, 33, 50, 55, 58, 86, 132, 142, 144, and 173, C.I. Direct Red 1, 4, 9, 80, 81, 225, and 227, C.I. Direct Blue 1, 2, 15, 71, 86, 87, 98, 165, 199, and 202, C.I. Direct Black 19, 38, 51, 71, 154, 168, 171, and 195, C.I. Reactive Red 14, 32, 55, 79, and 249, and C.I. Reactive Black 3, 4, and 35.

These dyes may be used alone or in combination of two or more kinds.

The content of the colorant is preferably 2 to 6% by mass in relation to the total mass (100% by mass) of the ink composition because viscosity is low and concealing properties and color reproducibility can be obtained.

12. Dispersant

When the ink composition according to the embodiment includes a pigment, the ink composition may further include a dispersant for improving pigment dispersibility. Examples of the dispersant include, but are not limited to, dispersants such as polymeric dispersants commonly used for preparing pigment dispersion liquids. Specific examples of the polymeric dispersants include those each containing, as a main component, at least one of polyoxyalkylene polyalkylene polyamines, vinyl polymers and copolymers, acryl polymers and copolymers, polyesters, polyamides, polyimides, polyurethanes, amino polymers, silicon-containing polymers, sulfur-containing polymers, fluorine-containing polymers, and epoxy resins. Commercially available products of the polymeric dispersants include Ajisper Series manufactured by Ajinomoto Fine-Techno Co., Inc., Solsperse Series (Solsperse 32000, 36000, and the like) available from Lubrizol Corporation, Disperbyk Series manufactured by BYK-Chemie Japan KK, and Disparlon Series manufactured by Kusumoto Chemicals, Ltd.

13. Slipping Agent

The ink composition according to the embodiment may further include a slipping agent, that is, an additive which makes a friction coefficient of the surface of a recorded matter decrease to have favorable slipping. As for the slipping agent, the aforementioned polyether-modified silicone oil or other additives may be used as a slipping agent. Specifically, the slipping agent is not particularly limited, and for example, a polyether-modified silicone oil or a polyester-modified silicone oil can be used as a silicone oil, and particularly, polyether-modified polydimethylsiloxane can be preferably used. Specific examples of the slipping agent include BYK-333, BYK-UV3500, 3510, 3530, and 3570 (above all manufactured by BYK-Chemie Japan KK).

These slipping agents may be used alone or in combination of two or more kinds thereof. The content of the slipping agent is not particularly limited, and the slipping agent may be added in an appropriate and preferable amount.

14. Other Additives

The ink composition according to the embodiment may further contain additives (components) other than the aforementioned additives. These components are not particularly limited, but, for example, a known polymerization accelerator, permeation accelerator, and wetting agent (humectant), and other additives can be used. Examples of the other additives include a known fixing agent, fungicide, antiseptic, antioxidant, ultraviolet absorber, chelating agent, pH adjuster, and thickener.

The ink composition according to the embodiment can be preferably used in ink jet recording methods according to an aqueous ink and an aqueous photocurable ink. This point will be described later.

As described above, according to the embodiment, it is possible to provide the ink composition for ink jet recording which is excellent in solid filling properties, storage stability and abrasion resistance and furthermore, excellent in discharge stability and adhesion. Specifically, when the liquid droplets (ink droplets) of the ink composition according to the embodiment are attached to the recording medium, the ink droplets instantly wet and spread on the recording medium, and hence, solid filling properties is excellent. In particular, since the aqueous photocurable ink is rapidly cured, the aqueous photocurable ink is necessarily made instantly wet and spread on the recording medium. Therefore, when the ink composition according to the embodiment is the aqueous photocurable ink, solid filling properties and the like are excellent.

In addition, there are screen printing, ink jet printing (recording) and the like as printing methods. However, the ink composition according to the embodiment is first used in ink jet recording so that solid filling properties and discharge stability are excellent.

Recording Medium

The ink composition according to the embodiment is attached to the recording medium to form a recorded material by an ink jet recording method described below. As the recording medium, for example, an absorbent recording medium, a low-absorbent recording medium or a non-absorbent recording medium can be used. The recording method can be widely applied to recording media having various absorption performances, ranging from a non-absorbent recording medium which an aqueous ink hardly permeates to an absorbent recording medium which an aqueous ink easily permeates.

The ink absorbent recording medium is not limited to the following examples, and examples of the ink absorbent recording medium include plain paper such as electrophotographic paper with high permeability to ink and paper for inkjet recording. An example of the paper for inkjet recording includes ink jet exclusive paper provided with an ink absorbing layer composed of silica particles or alumina particles or an ink absorbing layer composed of a hydrophilic polymer such as polyvinyl alcohol (PVA) and polyvinylpyrrolidone (PVP).

The ink low-absorbent recording medium is not limited to the following example and an example of the low-absorbent recording medium includes printing paper (recording paper) such as coated paper, finely coated paper, art paper, coat paper, matte paper and cast paper. In addition, the art paper, coat paper and cast paper have relatively low permeability to aqueous ink and are used for general offset printing.

The ink non-absorbent recording medium is not limited to the following examples and examples of the ink non-absorbent recording medium include plastic coated and plastic film attached substrates such as plastic films or paper on which no surface treatment is performed for ink jet recording (that is, which does not have an ink receiving layer), metal plates of iron, silver, copper, aluminum, and the like, metal plates and plastic films produced by vapor-depositing any one of the metals, alloy plates of stainless, brass, and the like. The plastic is not limited to the following examples and examples of the plastic include films and plates made of polyvinyl chloride (vinyl chloride, PVC), polyethylene terephthalate (PET), polycarbonate, polystyrene, polyurethane, polyethylene, polypropylene and the like.

Ink Jet Recording Method

An embodiment of the invention relates to an ink jet recording method. The ink composition for ink jet recording according to the embodiment can be used in the ink jet recording method according to this embodiment to perform ink jet recording. The recording method using an aqueous ink as the ink composition includes an ink attaching step and a heating step. Therefore, a coating film is formed of the ink composition dried on the recording medium. The recording method using an aqueous photocurable ink as the ink composition includes an ink attaching step and a curing step. Therefore, a cured film is formed of the ink composition cured on the recording medium.

These steps will be mainly described below.

1. Ink Attaching Step

The ink attaching step is a common step included in both cases of using any of the aqueous ink and the aqueous photocurable ink. The ink attaching step includes discharging the ink composition to the recording medium from a print head and attaching the ink composition to a recording surface of the recording medium. A method for attaching ink to a recording medium is not limited to the following examples, and examples of the method include application using a bar coater, spraying using a spray, and discharging ink to a recording medium from a print head provided in an ink jet recording apparatus.

From the above, the discharging will be further described. In the ink attaching step, the viscosity of the ink composition during discharging is preferably 25 mPa·s or less, more preferably 3 to 20 mPa·s, and still more preferably 3 to 13 mPa·s. When the viscosity of the ink composition has this value under a condition where the ink composition is at room temperature or is not heated, the ink composition may be discharged at room temperature or without heating. Therefore, the ink attaching step can be simplified and thus, it is preferable to have the value. On the other hand, the ink composition may be discharged after the viscosity is set to a preferable value by heating the ink to a predetermined temperature. In this manner, more excellent discharge stability is realized.

As a discharging method, known methods can be used and among the methods, the use of a method where liquid droplets are ejected by using vibration of a piezoelectric element (a recording method using a print head which forms an ink droplet by mechanical deformation of an electrostrictive element) enable to perform excellent image recording. The ink droplet weight during discharging is not limited and the ink droplet weight is preferably 1 to 20 ng. The ink recording resolution is not limited and the ink recording resolution is preferably 720 dpi×720 dpi to 1440 dpi×1440 dpi. When the liquid droplet weight and the recording resolution are in the aforementioned range, a recording image with high definition can be obtained.

Furthermore, the film thickness when the ink composition is applied (printed) on the recording medium is preferably 1 to 25 μm, and more preferably 2 to 10 μm because color density, adhesion and abrasion resistance of a recorded matter are favorable. In addition, when the ink composition is particularly an aqueous photocurable ink, and the film thickness is in the preferable range, curability is excellent. Then, the ink droplets discharged from the print head of the ink jet recording apparatus are landed (attached) to the recording surface of the recording medium to form an ink coating film, that is, an image.

2. Heating Step

The heating step is mainly performed in the case of using an aqueous ink and is a step of heating the recording medium to which the ink composition is attached. In particular, when the recording medium does not have an ink receiving layer, a favorable gloss can be obtained. Thus, it is preferable that printing is performed by heating the recording medium. The drying temperature at that time is preferably 30° C. to 50° C., and more preferably 35° C. to 45° C.

The heating can be performed by a method of bringing the recording medium into contact with a heat source, or a method of heating without contact with the recording medium by irradiating the recording medium with infrared rays, microwaves (electromagnetic waves having the maximum wavelength around 2,450 MHz) or the like or by blowing hot air over the recording medium.

Preferably, the heating is performed simultaneously with printing. In other words, the heating of a recording medium may be performed over the period for printing. The heating temperature is preferably 30 to 110° C., more preferably 40 to 100° C., still more preferably 50 to 90° C., depending on the type of the recording medium.

When the ink composition is an aqueous photocurable ink and the ink composition is applied to the non-absorbent recording medium, it is necessary to provide a heating step of curing the ink by ultraviolet irradiation and drying the ink. In this case, the heating step can be performed by the aforementioned conditions.

3. Curing Step

The curing step is included when an aqueous photocurable ink is used. The curing step is a step of curing the attached ink composition by ultraviolet irradiation. Specifically, the curing step includes irradiating the ink composition attached to the recording surface through the ink attaching step with ultraviolet rays and curing the ink composition. The step is a step of irradiating the image which had the ink attaching step with light (ultraviolet rays) to cure the ink.

Specifically, the irradiation of light initiates the polymerization reaction of the photocurable compound. The irradiation of light also decomposes the photoradical polymerization initiator included in the ink composition to generate initiating species such as a radical, an acid and a base, and thus the functions of the initiating species accelerate the polymerization reaction of the polymerizable compound. In this case, when a sensitizing dye is present together with the photoradical polymerization initiator in the ink composition, the sensitizing dye in the system absorbs the active radiation to be excited to an excited state, the contact of the excited sensitizing dye with the photoradical polymerization initiator accelerates the decomposition of the photoradical polymerization initiator to achieve a higher sensitivity curing reaction.

As the light source, mercury lamps, gas and solid lasers and the like are mainly used and mercury lamps and metal halide lamps are widely known as the light sources used for curing photocurable ink compositions for ink jet. On the other hand, nowadays from the viewpoint of environmental protection, mercury-free light sources are strongly demanded, and replacement of mercury lamps with GaN-based semiconductor ultraviolet light emitting devices is industrially and environmentally extremely useful. Moreover, ultraviolet light-emitting diodes (UV-LEDs) and ultraviolet laser diodes (UV-LDs) are small in size, long in operating life, high in efficiency and low in cost, and accordingly are expected as light sources for photocurable ink jet. Among these, UV-LEDs are preferable.

From the above reason, preferably, the ink composition for ink jet recording according to the embodiment can be cured by ultraviolet irradiation from the ultraviolet light-emitting diodes (UV-LEDs) among light emitting diodes (LEDs).

At the time of the irradiation, a light emission peak wavelength is preferably in a range from 360 to 420 nm and more preferably in a range from 380 to 400 nm. When the light emission peak wavelength is in the aforementioned range, UV-LEDs are preferable from the view point of being easily available and low cost.

In addition, one light emission peak wavelength may be in the preferable wavelength range and plural light emission peak wavelengths may be in the preferable wavelength range. Even when the plural light emission peak wavelengths are in the range, a total irradiation energy amount of the ultraviolet rays having the light emission peak wavelengths is set to the irradiation energy.

The peak intensity (peak irradiation intensity) of the ultraviolet irradiation in the above description is preferably 100 to 4,000 mW/cm$^2$, more preferably 500 to 2,000 mW/cm$^2$, and still more preferably 800 to 2,000 mW/cm$^2$. When the peak irradiation intensity is in the aforementioned range, curability is more excellent, the cost of an irradiation device can be suppressed, and heat generation and light leakage from a light source can be prevented from having an influence on the print head. Therefore, discharge stability is more excellent.

As the peak irradiation intensity in the specification, the value that is measured using an ultraviolet ray intensity meter UM-10 and a light receiving unit UM-400 (both manufactured by KONICA MINOLTA SENSING, INC.) can be used. However, the method for measuring the peak irradiation intensity is not limited thereto, and known measurement methods can be used.

Moreover, the irradiation energy at the time of irradiation is preferably 1,000 mJ/cm$^2$ or less, and more preferably 500 mJ/cm$^2$ or less. When the irradiation energy is in the aforementioned range, curability is more excellent and the cost of an irradiation unit necessary for the irradiation can be suppressed.

The irradiation energy is calculated by multiplying the irradiation time from irradiation start to irradiation end by the irradiation intensity. Sufficiently usable curing of a recorded matter may be made by one time of irradiation, or plural times of irradiation. The lower limit of the irradiation energy is not particularly limited, as long as sufficient curing can be made. However, the lower limit is preferably 10 mJ/cm$^2$ or more and more preferably 100 mJ/cm$^2$ or more.

When the aforementioned peak irradiation intensity, irradiation energy and light emission peak wavelength are in the preferable ranges, low-energy and high-speed curing is made possible due to the chemical composition the ink composition described later. In addition, the chemical composition of the ink composition enables to shorten the irradiation time, herewith leading to the increase of the printing speed. On the other hand, the chemical composition of the ink composition also enables to reduce the irradiation intensity, herewith leading to the realization of device size reduction and cost decrease.

As described above, according to the embodiment, it is possible to provide an ink jet recording method using the ink composition for ink jet recording excellent in solid filling properties, storage stability, abrasion resistance, discharge stability, and adhesion.

EXAMPLES

Hereinafter, the embodiments of the invention are more specifically described with reference to Examples and Comparative Examples, but the embodiments are not limited only to these Examples.

1. Materials Used

Materials used in Examples and Comparative Examples below are as follows.

1-1. Synthesis Materials for Urethane Acrylate

A: Hydroxyl Group-Containing Acrylates
  Polypropylene glycol monoacrylate having a weight average molecular weight of 400 (trade name: Blenmer AP-400, manufactured by NOF CORPORATION) (hereinafter, referred to as "PPG acrylate")
  Pentaerythritol triacrylate (trade name: Aronix M-305, manufactured by Toagosei Co., Ltd.)
  Dipentaerythritol pentaacrylate, dipentaerythritol hexaacrylate (trade name: Aronix M-403, manufactured by Toagosei Co., Ltd., the content of dipentaerythritol pentaacrylate: 50 to 60% by mass)
B: Diisocyanate
  Isophorone diisocyanate (hereinafter, referred to as "IPDI")
C: Diol of Acyclic Hydrocarbon or Cyclic Hydrocarbon Having 6 to 20 Carbon Atoms
  1,12-Dodecanediol and polypropylene glycol having a weight average molecular weight of 400 (trade name: Uniol D-400, manufactured by NOF CORPORATION)
D: Polyoxyalkylene Glycol Monoalkyl Ethers
  Polyethylene glycol monomethyl ether having a weight average molecular weight of 400 (trade name: methoxy PEG 400, manufactured by Toho Chemical Industry Co., Ltd.) (hereinafter, referred to as "methoxy PEG 400")
  Polyethylene glycol monomethyl ether having a weight average molecular weight of 1000 (trade name: methoxy PEG 1000, manufactured by Toho Chemical Industry Co., Ltd.) (hereinafter, referred to as "methoxy PEG 1000")
  Polyethylene glycol monomethyl ether having a weight average molecular weight of 2000 (trade name: Uniox M-2000, manufactured by NOF CORPORATION) (hereinafter, also referred to as "methoxy PEG 2000")

1-2. Synthesis Material for Cross-Linked Urethane Acrylate

In addition to the above-listed compounds, as a cross-linking agent, pentaerythritol tetrakis-3-mercaptopropionate (cross-linked thiol, hereinafter also referred to as "PEMP") was used.

1-3. Coating Film Forming Material

1-3-1. Photocurable Resin Emulsion (Aqueous) Photocurable resin emulsion (e-2) (hereinafter also referred to as "EM e-2", refer to Synthesis Example 2 described later as a production method)
(Aqueous) Photocurable resin emulsion (e-4) (hereinafter also referred to as "EM e-4", refer to Synthesis Example 3 described later as a production method)
(Aqueous) Photocurable resin emulsion (e-5) (hereinafter also referred to as "EM e-5", refer to Synthesis Example 4 described later as a production method)
The above (aqueous) photocurable resin emulsions include a photocurable compound and a photoradical polymerization initiator.
Laromer 8983 (aqueous photocurable aromatic urethane resin dispersion, trade name, manufactured by BASF Japan Ltd., MFT=0° C., Mw=10,000, solid content: 60%, hereinafter also referred to as "LR8983")
The photocurable aromatic urethane resin dispersion included in LR8983 is not the urethane (meth)acrylate represented by the aforementioned general formula (1), and the photocurable compound is included without the photoradical polymerization initiator (not including the initiator).

1-3-2. Non-Photocurable Resin Emulsion

Styrene-Acrylic acid copolymer resin (trade name: JONCRYL 538J, manufactured by BASF Japan Ltd.)
Here, JONCRYL 538J may not be photocurable.

1-4. Photopolymerization Initiator

Acylphosphine oxide-based photopolymerization initiator (trade name: IRGACURE 819DW, manufactured by BASF Japan Ltd., photoradical polymerization initiator, hereinafter, also referred to as "IRGACURE 819DW dispersion")

1-5. Fluorescent Brightening Agent 1,4-Bis(2-benzoxazolyl)naphthalene (trade name: HOSTALUX KCB, manufactured by Clariant (Japan) K.K.) (hereinafter, also referred to as "KCB")

1-6. Water-Soluble Organic Solvent 1,2-Hexanediol
Propylene glycol

1-7. Slipping Agent

BYK333 (SP value range: 18 to 23)

1-8. Pigment

C.I. Pigment Red 122 (hereinafter also referred to as "PR122")

1-9. Surface Control Agent

Polyether-modified siloxane (trade name: BYK-349, SP value range: 7.7 to 20, manufactured by BYK-Chemie Japan KK)

Polyether-modified siloxane (trade name: BYK-348, SP value range: 13 to 23, manufactured by BYK-Chemie Japan KK)

Polyorganosiloxane surfactant (trade name: PD570, SP value: 13 to 23, manufactured by Nissin Chemical Industry Co., Ltd.)

Polyether-modified siloxane (trade name: BYK-347, SP value range: 11 to 15, manufactured by BYK-Chemie Japan KK)

1-10. Dispersant

Solsperse 32000 (manufactured by Lubrizol Corporation)

Functions of each surface control agent will be summarized in the following Table 1. In addition, since the following Table 1 includes descriptions by measurement, the scope of invention is not limited by the following Table 1.

TABLE 1

| Kinds/Items | Solubility to water | Polyether chain (polarity) | Surface tension [mN/m] 1% in H$_2$O | Surface tension [mN/m] 1% in ink | Wettability and spreadability to vinyl chloride | Bubbling degree |
|---|---|---|---|---|---|---|
| BYK347 | Separated | Short | 21.7 | 24.6 | Good | Small |
| BYK349 | Presumed to be suspended or emulsified | Presumed to be in the middle of BYK347 and BYK348 | 22.1 | 23.8 | Good | Medium |
| BYK348 | soluble | Approximately medium | 22.4 | 25.1 | Bad | Large |
| PD570 | soluble | Presumed to be long | 25.8 | 27.1 | Bad | Large |

2. Configuration and Synthesis of Urethane Acrylates

2-1. Synthesis Example 1

Synthesis of Amphiphilic Urethane Acrylate (e)

In a reaction vessel equipped with a stirrer, a cooling tube, a dropping funnel and an air introduction tube, 444.6 parts (2 moles) by mass of IPDI and 400.0 parts by mass of polypropylene glycol having a weight average molecular weight of 400 were placed, and while the resulting mixture was being stirred, 0.34 parts by mass of tin octylate were added to the mixture, the temperature inside the reaction vessel was increased to 90° C., and the resulting mixture was allowed to react for 1.5 hours. Then, 1400.0 parts by mass of methoxy PEG 2000 and 0.90 parts by mass of tin octylate were added to the reaction mixture, and the resulting mixture was allowed to react further for 1.5 hours. Next, in the reaction vessel, 1300 parts by mass of dipentaerythritol pentaacrylate, 1.77 parts by mass of methoquinone and 2.13 parts by mass of tin octylate were placed and mixed, and under air bubbling, the temperature inside the reaction vessel was increased to 85° C. and the resulting mixture was allowed to react for 3 hours. Then, the reaction mixture was cooled to obtain the amphiphilic urethane acrylate (e) represented by the general formula (1). The weight average molecular weight of the urethane acrylate (e) was found to be 9,000.

2-2. Production Example 1

Synthesis of Urethane Acrylate for Fixing

In the same reaction vessel as in Example 1, 444.6 parts by mass (2 moles) of IPDI and 900.0 parts by mass (1 mole) of an aromatic polyester diol (weight average molecular weight: 900, trade name: YG-108, manufactured by ADEKA CORPORATION.) were placed, and while the resulting mixture was being stirred, 0.27 parts by mass of tin octylate were added to the mixture, the temperature inside the reaction vessel was increased to 85° C., and the resulting mixture was allowed to react for 2 hours. Then, 232.3 parts by mass (2 moles) of 2-hydroxyethyl acrylate, 0.79 parts by mass of methoquinone and 0.63 parts by mass of tin octylate were placed in the reaction vessel and mixed, and under air bubbling, the temperature inside the reaction vessel was increased to 85° C. and the resulting mixture was allowed to react for 2 hours. Then, the reaction mixture was cooled to obtain the urethane acrylate. The weight average molecular weight of the urethane acrylate was found to be 5,000.

3. Preparation of (Aqueous) Photocurable Resin Emulsion

Hereinafter, the preparation methods of (aqueous) photocurable resin emulsions will be described.

3-1. Synthesis Example 2

Preparation of (Aqueous) Photocurable Resin Emulsion (e-2)

In the same reaction vessel as in Example 1, 23.9 parts by mass of the amphiphilic urethane acrylate (e) obtained above, 10.3 parts by mass of polypentaerythritol polyacrylate, 3.3 parts by mass of a photoradical polymerization initiator (TPO) and 0.07 parts by mass of a fluorescent brightening agent (KCB) were placed, and while the resulting mixture was being stirred, the temperature inside the vessel was increased to 80° C. and maintained at 80° C. for 2 hours. Next, the temperature inside the vessel was cooled to 50° C., and then, while the mixture was being stirred, 2.4 parts by mass of a cross-linking agent (PEMP) was added to the mixture, and the mixture was continuously stirred as it was for 15 minutes. Then, 60 parts by mass of deionized water was added to the mixture, the mixture was maintained at 50° C. for 1 hour, then the temperature inside the vessel was increased to 80° C., and the mixture was maintained at 80° C. for 6 hours to obtain the (aqueous) photocurable resin emulsion (e-2) containing 40% of a nonvolatile content (the amphiphilic urethane acrylate (e), polypentaerythritol polyacrylate, the photoradical polymerization initiator (TPO), the fluorescent brightening agent (KCB) and the cross-linking agent (PEMP)). The emulsion was subjected to a GPC measurement to identify a cross-linked urethane (meth)acrylate having a weight average molecular weight of 20,000. The chemical composition is shown in the following Table 2.

3-2. Synthesis Example 3

Preparation of (Aqueous) Photocurable Resin Emulsion (e-4)

In the same reaction vessel as in Example 1, 21.6 parts by mass of the amphiphilic urethane acrylate (e) obtained above, 9.2 parts by mass of polypentaerythritol polyacrylate, 5.0 parts by mass of a photoradical polymerization initiator (TPO), 1.7 parts by mass of a photoradical polymerization initiator (DETX) and 0.06 parts by mass of a fluorescent brightening agent (KCB) were placed, and while the resulting mixture was being stirred, the temperature inside the vessel was increased to 80° C. and maintained at 80° C. for 2 hours. Next, the temperature inside the vessel was cooled to 50° C., and then, while the mixture was being stirred, 2.5 parts by mass of a cross-linking agent (PEMP) was added to the mixture, and the mixture was continuously stirred as it was for 15 minutes. Then, 60 parts by mass of deionized water was added to the mixture, the mixture was maintained at 50° C. for 1 hour, then the temperature inside the vessel was increased to 80° C., and the mixture was maintained at 80° C. for 6 hours to obtain the (aqueous) photocurable resin emulsion (e-4) containing 40% of a nonvolatile content (the amphiphilic urethane acrylate (e), polypentaerythritol polyacrylate, the photoradical polymerization initiators (TPO, DETX), the fluorescent brightening agent (KCB) and the cross-linking agent (PEMP)). The emulsion was subjected to a GPC measurement to identify a cross-linked urethane (meth)acrylate having a weight average molecular weight of 22,000. The chemical composition is shown in the following Table 2.

3-3. Synthesis Example 4

Preparation of (Aqueous) Photocurable Resin Emulsion (e-5)

In the same reaction vessel as in Example 1, 21.6 parts by mass of the amphiphilic urethane acrylate (e) obtained above, 7.7 parts by mass of polypentaerythritol polyacrylate, 1.5 parts by mass of the urethane acrylate for fixing, 5.0 parts by mass of a photoradical polymerization initiator (TPO) and 1.7 parts by mass of a photoradical polymerization initiator (DETX) were placed, and while the resulting mixture was being stirred, the temperature inside the vessel was increased to 80° C. and maintained at 80° C. for 2 hours. Next, the temperature inside the vessel was cooled to 50° C. and then, while the mixture was being stirred, 2.5 parts by mass of a cross-linking agent (PEMP) was added to the mixture, and the mixture was continuously stirred as it was for 15 minutes. Then, 60 parts by mass of deionized water was added to the mixture, the mixture was maintained at 50° C. for 1 hour, then the temperature inside the vessel was increased to 80° C., and the mixture was maintained at 80° C. for 6 hours to obtain the (aqueous) photocurable resin emulsion (e-5) containing 40% of a nonvolatile content (the amphiphilic urethane acrylate (e), polypentaerythritol polyacrylate, the urethane acrylate for fixing, the photoradical polymerization initiators (TPO, DETX) and the cross-linking agent (PEMP)). The emulsion was subjected to a GPC measurement to identify a cross-linked urethane (meth)acrylate having a weight average molecular weight of 18,000. The chemical composition is shown in the following Table 2.

TABLE 2

| Material Type | Abbriviation | EM e-2 dispersion | EM e-4 dispersion | EM e-5 dispersion |
|---|---|---|---|---|
| Amphiphilic urethane acrylate | (e) | 23.9 | 21.6 | 21.6 |
| Cross-linked thiol | PEMP | 2.4 | 2.5 | 2.5 |
| Radical polymerizable acrylate | Biscoat 802 | 10.3 | 9.2 | 7.7 |
| Photoradical polymerization initiator | TPO | 3.3 | 5 | 5 |
| | DETX | — | 1.7 | 1.7 |
| Urethane acrylate for fixing | | — | — | 1.5 |
| Fluorescent brightening agent | KCB | 0.07 | 0.06 | — |
| Water | Ion exchanged water | Remnant | Remnant | Remnant |
| Total amount (%) | | 100.0 | 100.0 | 100.0 |

4. Examples 1 to 10 and Comparative Examples 1 to 5

Preparation of Ink Composition

The ink compositions were prepared by adding the components in the following Tables 3 and 4 so as to have the chemical composition (unit is % by mass) in the following Tables 3 and 4 and stirring the resulting products by a high-speed water cooling stirrer.

In Tables 3 and 4, the (aqueous) photocurable resin emulsion, (aqueous) non-photocurable resin emulsion and photopolymerization initiator were shown in terms of solid content.

TABLE 3

| | | Examples 1 to 10 | | | | | |
|---|---|---|---|---|---|---|---|
| | | Example No. | | | | | |
| Items | | 1 | 2 | 3 | 4 | 5 | 6 |
| Photocurable resin emulsion | e-2 | 11.00 | 11.00 | 11.00 | 11.00 | 11.00 | 11.00 |
| | e-4 | — | — | — | — | — | — |
| | e-5 | — | — | — | — | — | — |
| | LR8983 (not including initiator) | — | — | — | — | — | — |

TABLE 3-continued

Examples 1 to 10

| | | | | | | | |
|---|---|---|---|---|---|---|---|
| Non-photocurable resin emulsion | JONCRYL 538J | — | — | — | — | — | — |
| Photopolymerization initiator | IRGACURE 819DW | — | — | — | — | — | — |
| Water-soluble organic solvent | 1,2-hexanediol | 3.00 | 3.00 | 3.00 | 3.00 | 3.00 | 3.00 |
| | Propylene glycol | 10.00 | 10.00 | 10.00 | 10.00 | 10.00 | 10.00 |
| Slipping agent | BYK333(SP value: 18 to 23) | 0.50 | 0.50 | 0.50 | 0.50 | 0.50 | — |
| Pigment | PR122 | 3.00 | 3.00 | 3.00 | 3.00 | — | 3.00 |
| Dispersant | Solsperse 32000 | 1.00 | 1.00 | 1.00 | 1.00 | — | 1.00 |
| Surface control agent | BYK349(SP value: 7.7 to 20) | 0.10 | 0.50 | 1.00 | 1.50 | 1.00 | 1.00 |
| | BYK348(SP value: 13 to 23) | — | — | — | — | — | — |
| | PD570(SP value: 13 to 23) | — | — | — | — | — | — |
| | BYK347(SP value: 11 to 15) | — | — | — | — | — | — |
| Water | | Remnant | Remnant | Remnant | Remnant | Remnant | Remnant |
| Total (% by mass) | | 100.00 | 100.00 | 100.00 | 100.00 | 100.00 | 100.00 |

| | | Example No. | | | |
|---|---|---|---|---|---|
| | Items | 7 | 8 | 9 | 10 |
| Photocurable resin emulsion | e-2 | — | — | — | — |
| | e-4 | 11.00 | — | — | — |
| | e-5 | — | 11.00 | — | — |
| | LR8983 (not including initiator) | — | — | 10.00 | — |
| Non-photocurable resin emulsion | JONCRYL 538J | — | — | — | 10.00 |
| Photopolymerization initiator | IRGACURE 819DW | — | — | 1.00 | — |
| Water-soluble organic solvent | 1,2-hexanediol | 3.00 | 3.00 | 3.00 | 3.00 |
| | Propylene glycol | 10.00 | 10.00 | 10.00 | 10.00 |
| Slipping agent | BYK333(SP value: 18 to 23) | 0.50 | 0.50 | 0.50 | 0.50 |
| Pigment | PR122 | 3.00 | 3.00 | 3.00 | 3.00 |
| Dispersant | Solsperse 32000 | 1.00 | 1.00 | 1.00 | 1.00 |
| Surface control agent | BYK349(SP value: 7.7 to 20) | 1.00 | 1.00 | 1.00 | 1.00 |
| | BYK348(SP value: 13 to 23) | — | — | — | — |
| | PD570(SP value: 13 to 23) | — | — | — | — |
| | BYK347(SP value: 11 to 15) | — | — | — | — |
| Water | | Remnant | Remnant | Remnant | Remnant |
| Total (% by mass) | | 100.00 | 100.00 | 100.00 | 100.00 |

TABLE 4

Comparative Examples 1 to 5

| | | Comparative Example No. | | | | |
|---|---|---|---|---|---|---|
| | Items | 1 | 2 | 3 | 4 | 5 |
| Photocurable resin emulsion | e-2 | 11.00 | 11.00 | 11.00 | — | — |
| | e-4 | — | — | — | — | — |
| | e-5 | — | — | — | — | — |
| | LR8983 (not including initiator) | — | — | — | — | — |
| Non-photocurable resin emulsion | JONCRYL 538J | — | — | — | — | 10.00 |
| Photopolymerization initiator | IRGACURE 819DW | — | — | — | — | — |
| Water-soluble organic solvent | 1,2-hexanediol | 3.00 | 3.00 | 3.00 | 3.00 | 3.00 |
| | Propylene glycol | 10.00 | 10.00 | 10.00 | 10.00 | 10.00 |
| Slipping agent | BYK333(SP value: 18 to 23) | 0.50 | 0.50 | 0.50 | 0.50 | 0.50 |
| Pigment | PR122 | 3.00 | 3.00 | 3.00 | 3.00 | 3.00 |
| Dispersant | Solsperse 32000 | 1.00 | 1.00 | 1.00 | 1.00 | 1.00 |
| Surface control agent | BYK349(SP value: 7.7 to 20) | — | — | — | 1.00 | — |
| | BYK348(SP value: 13 to 23) | 1.00 | — | — | — | 1.00 |
| | PD570(SP value: 13 to 23) | — | 1.00 | — | — | — |
| | BYK347(SP value: 11 to 15) | — | — | 1.00 | — | — |
| Water | | Remnant | Remnant | Remnant | Remnant | Remnant |
| Total (% by mass) | | 100.00 | 100.00 | 100.00 | 100.00 | 100.00 |

5. Basic Conditions of Printing

A serial printer including a print head having a nozzle pitch of 360 dpi and 360 nozzles, a platen heater capable of heating the recording medium on a platen, and an after heater arranged on the downstream side of the recording medium from the platen in a transport direction was used. As the serial printer, PX-5100 (trade name, manufactured by Seiko Epson Corporation) was altered to have such a configuration and used. In addition, as the recording medium, a vinyl chloride film (Mactac JT-5829R) was used. Moreover, as the light source to irradiate the recording medium discharged from the printer, an LED having a peak wavelength of 395 nm and a peak intensity of 1,000 mW/cm$^2$ was separately provided.

Printing was performed in the state in which the recording medium was heated on the platen at 55° C. After the printing, the recording medium was further heated at the same temperature (55° C.) in an after heater region, a total heating time from the start of ink attachment at an arbitrary point in a sub-scanning direction of the recording medium (transport direction of the recording medium) to the end of heating at the point was set to 1 minute and heating and drying were performed. However, in the example of using the non-photocurable resin emulsion (JONCRYL 538J), the total heating time was 3 minutes to fix the resin. As the heating temperature of the recording medium, the temperature of the recording surface of the recording medium was measured using a non-contact thermometer at the center position of the recording medium that is opposite to the print head and a main scanning direction of the print head (width direction of the recording medium).

After the heating (drying), the recording medium discharged from the printer was irradiated with ultraviolet rays from the light source (LED) in which the irradiation energy was 500 mJ/cm$^2$.

6. Evaluation Items

6-1. Solid Filling Properties

A solid pattern of 2 cm$^2$×2 cm$^2$ was printed on the vinyl chloride (Mactac JT-5829R), and a degree of solid filling was evaluated based on a degree of white streaks (unfilled portions) at a Duty of 100%. In addition, the printing resolution was set to 720 dpi×720 dpi and an ink amount (ink droplet amount) per pixel was set to 14 ng.

The evaluation standards are as follows. The evaluation results are shown in the following Table 5.
AAA: No unfilled portion was observed in the solid pattern.
AA: The area of the unfilled portion was 5% or less in the solid pattern.
A: The area of the unfilled portion was more than 5% and 10% or less in the solid pattern.
B: The area of the unfilled portion was more than 10% in the solid pattern.

6-2. Discharge Stability

The discharge stability was evaluated based on a landing shift and mist generated when ink was discharged at a room temperature.

Dot formation with a printing resolution of 720 dpi×720 dpi was performed on the recording medium to form a solid pattern. The solid pattern was formed for 10 minutes and the number of an undischarged nozzle and a nozzle in which a landing shift was generated among 360 nozzles were counted.

The nozzle shifted by 1/720 inches or more which is a distance between adjacent normal dots was set to a nozzle in which a landing shift is generated. Moreover, the nozzle that was shifted by the distance or more and in which a satellite (division dot) causing mist is generated was also considered as the nozzle in which a landing shift was generated.

The evaluation standards are as follows. The evaluation results are shown in the following Table 5.
AAA: 0
AA: 1 to 2
A: 3 to 5
B: 6 or more

6-3. Storage Stability

The storage stability was evaluated based on a rate of viscosity change after ink was allowed to be maintained for 10 days at 60° C.

The evaluation standards are as follows. The evaluation results are shown in the following Table 5.
A: The rate of viscosity change was 5% or less.
B: The rate of viscosity change was more than 5%.

6-4. Adhesion by Cutting Test

In accordance with JIS K-5600-5-6 (ISO 2409) (Testing methods for paints-Part 5: Mechanical property of film-Section 6: Adhesion test (Cross-cut test)), adhesion between a PET film (Rumirer 125E20 (trade name), manufactured by Toray Industries, Inc.) and an image formed by solid printing under the same conditions (printing and curing conditions) as those in the "curing wrinkles" evaluation was evaluated. The cross-cut test will now be described.

As cutting tools, a single blade cutter (commonly commercially available cutter) and a guide for making cuts at equal intervals with the single blade cutter were prepared.

First, six cuts were made in a recorded matter with the blade of the cutter vertically put on the coating film. After making the six cuts, the blade was turned by 90° and made another six cuts so as to be orthogonal to the six cuts previously made.

About 75 mm of transparent adhesive tape (width: 25±1 mm) was attached to the coating film at the portion provided with the cuts in a lattice form. The tape was sufficiently rubbed with a finger so that the coating film can be seen through the tape. Within 5 minutes from the adhesion, the tape was certainly peeled off at an angle of about 60° with taking 0.5 to 1.0 seconds.

The evaluation standards are as follows. The evaluation results are shown in the following Table 5.
AA: Peeling was observed in less than 5% of the lattices.
A: Peeling was observed in 5% or more and less than 35% of the lattices.
B: Peeling was observed in 35% or more of the lattices.

6-5. Abrasion Resistance

In accordance with JIS K5701 (ISO 11628) (regulation for methods of testing ink, color-developing sample, and printed matter used in planographic printing), abrasion resistance was evaluated using a Gakushin-type rubbing fastness tester (manufactured by TESTER SANGYO CO., LTD.). A cannequin was placed on the surface of a recorded matter (solid image) obtained by solid printing under the same conditions (printing and curing conditions) as those in the "curing wrinkles" evaluation. The surface was rubbed 50 times with the cannequin under a load of 500 g. Peeling off of cured surface of the recorded matter after rubbing was compared by visual observation.

The evaluation standards are as follows. The evaluation results are shown in the following Table 5.
AAA: No stain was observed on the cannequin, and no peeling and scratch were observed on the image surface.
AA: Stain was observed on the cannequin, but no peeling and scratch were observed on the image surface.
A: Stain was observed on the cannequin, and some peeling and scratches were observed on the image surface
B: Stain was observed on the cannequin, and many peeling and scratches were observed on the image surface

TABLE 5

Examples 1 to 10 and Comparative Examples 1 to 5

| Evaluation items | Example | | | | | | | | | | Comparative Example | | | | |
|---|---|---|---|---|---|---|---|---|---|---|---|---|---|---|---|
| | 1 | 2 | 3 | 4 | 5 | 6 | 7 | 8 | 9 | 10 | 1 | 2 | 3 | 4 | 5 |
| Solid filling properties | A | AA | AAA | AAA | AAA | AAA | AAA | AAA | AAA | AAA | B | B | AA | AAA | B |
| Discharge Stability | AAA | AA | AA | A | AA | AA | AA | AA | AA | AA | B | B | A | AAA | B |
| Storage stability | AA | AA | AA | AA | AA | AA | AA | AA | A | A | AA | AA | B | AAA | A |
| Adhesion | AA | AA | AA | AA | AA | AA | A | AA | A | A | AA | AA | AA | B | A |
| Abrasion resistance | A | AA | AA | AA | A | AA | AA | AA | AAA | AA | A | A | A | B | AA |

From Table 5, it was found that the ink composition for ink jet recording (each of Examples) each containing the coating film forming material, the polyether-modified silicone oil and water in which the polyether-modified silicone oil was soluble in a solvent have the lower limit of 8.5 or less and the upper limit of 18.0 or more in a SP value were excellent in solid filling properties, storage stability and abrasion resistance as compared to other ink compositions (each of Comparative Examples), and further excellent in discharge stability and adhesion.

Hereinafter, the following discussion will be made based on Examples and Comparative Examples. However, the scope of the invention is not limited to the content of the discussion.

Here is discussed the surface control agent contained in the ink composition. When the hydrophilic BYK348 (Comparative Examples 1 and 5), and PD570 (Comparative Example 2) included in an aqueous ink in many cases were used, as compared to each of Examples, particularly, solid filling properties and discharge stability were deteriorated. This is presumed that while the ink is dried, BYK348 and PD570 are separated from the ink.

On the other hand, when hydrophobic (lipophilic) BYK347 (Comparative Example 3) was used, wettability and spreadability on the vinyl chloride film were improved so that solid filling properties were favorable. However, storage stability was deteriorated (particularly under a high temperature). In Comparative Example 3, the ink composition is an aqueous photocurable ink including BYK347, and has a low solid content and a high solvent content. Therefore, it is presumed that the clouding point is extremely low. In addition, since the hydrophobic BYK347 is easily dissolved in an organic solvent and hardly dissolved in water, it is presumed that BYK347 is not dissolved in an aqueous ink and separated (from the ink preparation). That is, it is presumed that the ink composition including the surface control agent biased to the hydrophobicity has a tendency to deteriorate storage stability.

Contrarily, when BYK349 (each of Examples) having a wide solubility range from lipophilicity to hydrophilicity was used, solid filling properties, discharge stability, storage stability, adhesion and abrasion resistance were favorable. Since BYK349 has a wide solubility range, it is presumed that time to wet and spread on the vinyl chloride film becomes longer and resultantly, wettability and spreadability are favorable so that solid filling properties also favorable.

In addition, it was found that the ink composition (Comparative Example 4) not including the coating film forming material (not including a solid substance) was poor at adhesion and abrasion resistance. Furthermore, the ink compositions (Examples 1 to 8) containing the (aqueous) photocurable resin emulsion including the photopolymerization initiator as a coating film forming material were more excellent in storage stability and adhesion as compared to the ink compositions (Examples 9 and 10, Comparative Example 5) containing the (aqueous) photocurable resin emulsion not including the photopolymerization initiator or the (aqueous) non-photocurble resin emulsion as the coating film forming material.

The entire disclosure of Japanese Patent Application No. 2012-143886, filed Jun. 27, 2012 is expressly incorporated by reference herein.

What is claimed is:

1. An ink composition for ink jet recording comprising:
a coating film forming material;
a polyether-modified silicone oil; and
water,
wherein the polyether-modified silicone oil is a compound at least represented by the following general formula (A)

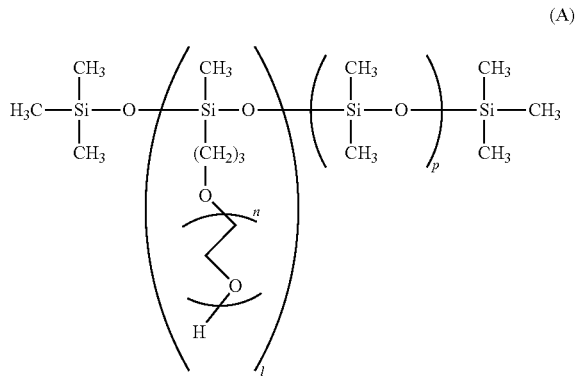

(A)

(wherein in the formula (A), l is 6 to 12, n is 3 to 12, and p is 25 or less).

* * * * *